United States Patent [19]

Tamehira

[11] Patent Number: 5,711,405
[45] Date of Patent: Jan. 27, 1998

[54] SPRING CLUTCH MECHANISM AND A CLUTCH MECHANISM FOR USE IN A PAPER FEEDING APPARATUS

[75] Inventor: Masato Tamehira, Yamabe-gun, Japan

[73] Assignee: Sharp Kabushiki Kaisha, Osaka, Japan

[21] Appl. No.: 638,737

[22] Filed: Apr. 29, 1996

[30] Foreign Application Priority Data

Jun. 16, 1995 [JP] Japan ................................. 7-150173

[51] Int. Cl.$^6$ ................................................. F16D 13/00
[52] U.S. Cl. ................................. 192/26; 192/41 S; 192/81 C
[58] Field of Search ........................ 192/26, 12 BA, 192/33 C, 41 S, 81 C

[56] References Cited

U.S. PATENT DOCUMENTS

| Re. 25,229 | 8/1962 | Sacchini et al. | 192/41 S X |
|---|---|---|---|
| 1,909,420 | 5/1933 | Palmgren | 192/81 C |
| 2,885,896 | 5/1959 | Hungerford, Jr. et al. | 192/41 S X |
| 3,521,730 | 7/1970 | Weatherby | 192/33 C X |
| 3,542,160 | 11/1970 | Sacchini | 192/81 C X |
| 3,726,372 | 4/1973 | Baer et al. | 192/33 C X |
| 4,189,039 | 2/1980 | Johnson | 192/26 |
| 4,191,283 | 3/1980 | Keeny, III | 192/26 |
| 4,193,483 | 3/1980 | Ariga et al. | 192/26 |
| 4,760,903 | 8/1988 | Stegelmeier et al. | 192/81 C X |
| 5,101,944 | 4/1992 | Kawai | 192/33 C X |
| 5,335,760 | 8/1994 | Leone | 192/33 C X |

FOREIGN PATENT DOCUMENTS

| 10566 | 5/1956 | Germany | 192/41 S |
|---|---|---|---|
| 57-190123 | 11/1982 | Japan | 192/33 C |
| 63-130934 | 6/1988 | Japan | 192/41 S |
| 611997 | 9/1988 | Japan . | |

*Primary Examiner*—Richard M. Lorence

[57] ABSTRACT

A spring clutch includes a driving-side boss integrally formed with a driving gear and a driven-side boss having a feed roller fixed. The driving-side and driven-side bosses are arranged on a common axis so as to be opposed to each other. A coil spring is wound on the peripheral side of the driving-side boss and driven-side boss. The spring clutch further has a sleeve fitted over the coil spring while a driving-side coil end of the coil spring is engaged with the sleeve. As rotation of the coil spring and the sleeve is restricted by a projection formed on the peripheral surface of the sleeve, the coil spring is idly fitted on the driving-side boss so that the rotation of the driving-side boss is not transmitted to the driven-side boss while the reverse rotation of the driven-side boss is restricted.

30 Claims, 12 Drawing Sheets

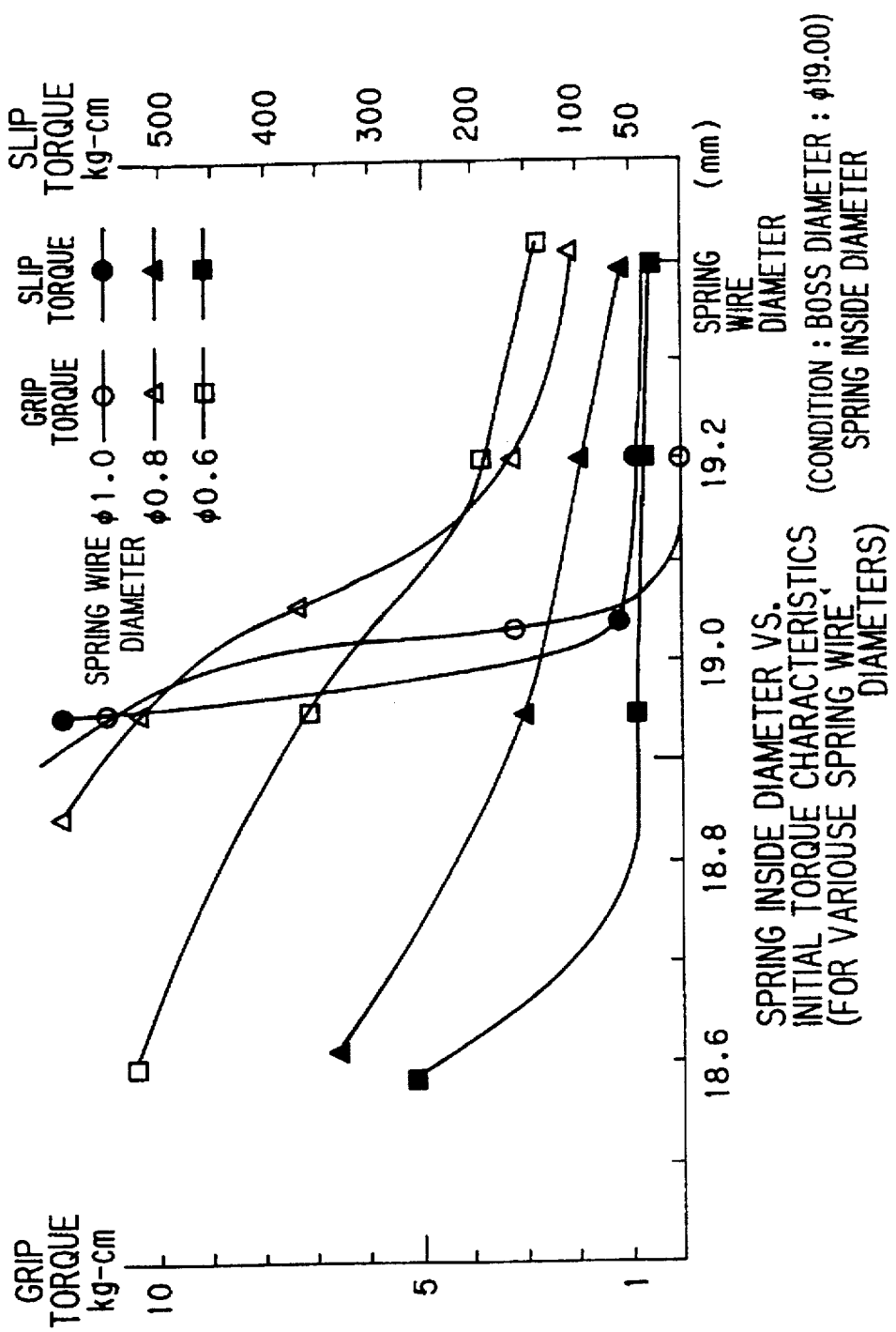

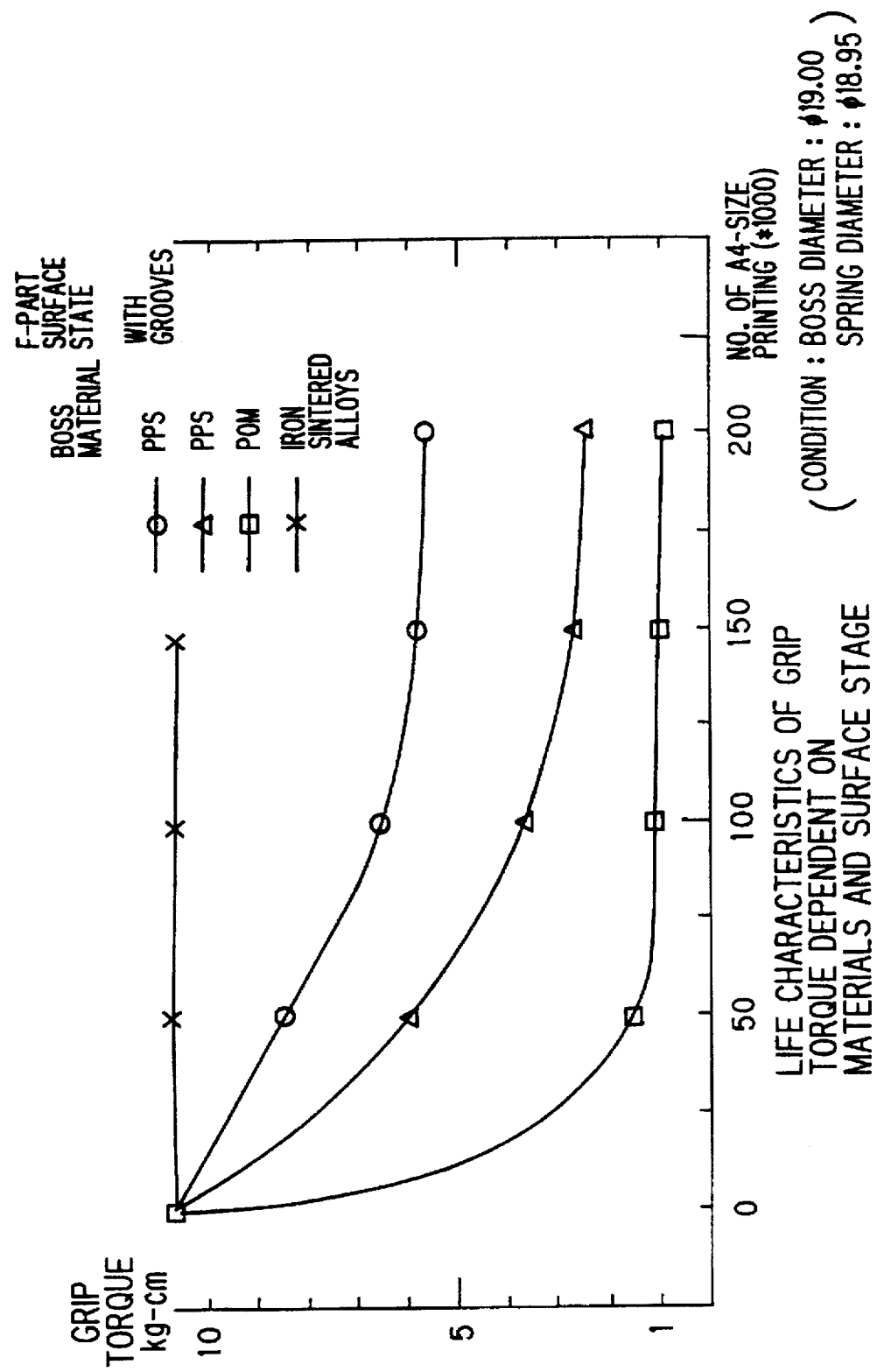

SPRING CLUTCH MECHANISM AND A CLUTCH MECHANISM FOR USE IN A PAPER FEEDING APPARATUS

BACKGROUND OF THE INVENTION (1) Field of the Invention

The present invention relates to a spring clutch mechanism for transmitting rotations of a driving shaft to a driven roller shaft selectively through a coil spring, and particularly relates to a clutch mechanism for controlling the rotation of a paper feed roller in a paper feeding apparatus for feeding paper.

(2) Description of the Prior Art

For example, an image forming apparatus such as a laser printer etc., has a paper conveying passage which is arranged inside the machine from the paper feeding portion through the image forming portion to the paper discharging portion so that paper is conveyed through the paper conveying passage. The paper feeding portion has a feed roller which abuts a stack of paper and delivers a sheet of paper to the paper conveying passage as it turns. In order to feed sheets of paper one by one by the rotation of the feed roller, it is necessary to control the rotation of the feed roller so that a plurality of papers will not be fed successively.

To achieve this, Japanese Utility Model Publication Hei 6 No. 11,997 discloses a configuration which includes a spring clutch 90 and a stopper device 96 as shown in FIG. 1 for transmitting rotation of a driving shaft 80 with a driving gear 83 fixed thereon to a rotary shaft 81 with a roller 82 fixed thereon. The spring clutch 90 is composed of a driving-side boss 84 rotatably supported on the rotary shaft 81 and geared so as to mesh with a driving gear 83, a driven-side boss 91 fixed on the rotary shaft 81, a coil spring 92 fitted on both the driving-side boss 84 and the driven-side boss 91 and engaged on its one side with the driven-side boss 91, a claw wheel 93 which is fitted over the coil spring 92 and formed with a projection on the peripheral surface and engages the other end of the coil spring 92. The stopper device 96 is composed of a solenoid 94 and a stopper 95 abutting the projection of the claw wheel 93 in link with the actuator of the solenoid 94.

In the spring clutch 90, rotational force is always transmitted to the driven-side boss 84 from the driving shaft 80 through the driving gear 83. When the solenoid 94 in the stopper device 96 is deactivated, the stopper 95 abuts the projection of the claw wheel 93 as indicated by solid lines in the figure so as to stop the rotation of the claw wheel 93. At this moment, the other end of the coil spring 92 is engaged with the claw wheel 93 and therefore stopped. Accordingly, the rotation of the driving-side boss 84 causes the coil spring 92 to become large in its inside diameter so that the driving-side boss 84 idly rotates relative to the coil spring 92. That is, when the solenoid 94 is deactivated, the rotation on the driving-side will not be transmitted to the driven side through the coil spring 92.

Conversely, as the solenoid 94 in the stopper device 96 is activated, the stopper 95 is placed as indicated by chained lines in the figure so as not to abut the claw wheel 93, whereby the claw wheel 93 as well as the other end of the coil spring 92 is made freely rotatable. Accordingly, the free end of the coil spring 92 is rotated together with the claw wheel 93 so that the coil spring 92 is reduced in its inside diameter therefore frictionally engages the driving-side boss 84 and the driven-side boss 91. As a result the rotation of the driving-side boss 84 is transmitted to the driven-side boss 91 through the coil spring 92 to rotate the roller 82.

Hence, when the solenoid 94 is activated in a predetermined period when a sheet of paper is to be fed, the rotation of the driving shaft 80 is transmitted to the rotary shaft 81 during the period to rotate the roller 82. That is, by turning the solenoid 94 on and off, it is possible to control the rotation of the roller 82.

There has been a configuration in which, in order to control the feed timing of a sheet of paper, the sheet fed is once abutted at its front end against an unrotating registration roller and then allowed to advance by starting the rotation of the registration roller at a predetermined timing. In this configuration, when the front end of the sheet reaches the registration roller, the rear part of the sheet may remain in contact with the feed roller. In such a case, the frictional load acted on the sheet by the feed roller unrotating will affect the conveyance of the sheet by the rotation of the registration roller, to retard the feeding speed of the sheet as compared to the state of the image forming side and thereby cause a constriction of the resulting image. In order to eliminate this problem, it is necessary to allow the feed roller to be freely rotatable even if the transmission of the rotational force is stopped. However, if the feed roller is allowed to freely rotate in a counter direction to that of the rotation of the driving shaft, the sheet may move in the opposite direction to the feeding direction due to the reaction force generated when the front end of the sheet abuts the unrotating registration roller. As a result, it sometimes happens that the conveyance of the sheet can not be started when the registration roller starts to rotate.

To deal with this problem, a one-way clutch is provided for the rotary shaft with the feed roller fixed thereon so as to allow the feed roller to freely rotate only in the paper feeding direction and prohibit the rotation of the feed roller in the opposite direction to the paper feeding direction.

In the above conventional clutch mechanism, it is necessary to separately provide the one-way clutch for restricting the reverse rotation of the rotary shaft, in addition to the spring clutch for selectively activating the rotation of the rotary shaft. This configuration increases the cost and size of the device therefore it is impossible to meet the demand of reducing the size and cost of the apparatus such as a laser printer and the like.

SUMMARY OF THE INVENTION

A first object of the invention is to provide a spring clutch mechanism which is able to stop rotation of a driving shaft relative to a driven shaft in a state where the reverse rotation of the driven shaft is prohibited, without needing a separate one-way clutch for prohibiting the reverse rotation of the driven shaft, whereby the device can be reduced in cost and size.

A second object of the invention is to provide a spring clutch mechanism which is able to prevent a driven shaft from being damaged by sliding contact of a free coil end on the driven side of a coil spring with the peripheral surface of the driven shaft.

A third object of the invention is to provide a spring clutch mechanism which allows a driven shaft to freely rotate in the rotational direction of a driving shaft when rotation of the driving shaft is transmitted to the driven shaft and the driven shaft to freely rotate in both directions when driving force is not transmitted to the driven shaft.

A fourth object of the invention is to provide a spring clutch mechanism which permits greater tolerance limits of driving-shaft side parts and driven-shaft side parts to thereby simplify the assembling work.

A fifth object of the invention is to provide a spring clutch mechanism which is able to prevent generation of clicking noises and abrasion that would be caused when a link stopper abuts a series of driven-side engaging portions formed on the peripheral surface of a driven shaft.

A sixth object of the invention is to provide a spring clutch mechanism which has a coil spring having a circular section and therefore can easily be manufactured in reduced manufacture cost.

A seventh object of the invention is to provide a spring clutch mechanism which is able to prevent damages to the device by preventing a coil spring from plunging into a gap between driving and driven shafts.

An eighth object of the invention is to provide a clutch mechanism for use in a paper feeding device which is able to stably perform paper feeding operations as well as allows the user to easily cancel a malfunctioned state of paper feeding such as jamming or twofold feeding.

A ninth object of the invention is to provide a clutch mechanism for use in a paper feeding device which is able to transmit sufficient torque for feeding copy paper from a driving shaft to a driven shaft as well as to perform smooth operations by reducing resistant force which is generated when driving or driven shaft idly rotates relative to a coil spring.

The present invention has been achieved to attain the above objects and the gist of the invention is as follows:

In accordance with a first feature of the invention, a spring clutch mechanism for selectively transmitting rotation of a driving shaft to a driven shaft through a coil spring, includes:

driving and driven shafts disposed opposite to each other on a common axis;

a coil spring formed of coil wire fitted on the driving and driven shafts;

a sleeve formed with an engaging portion at a site on the peripheral surface thereof; and a stopper selectively engaging the engaging portion of the sleeve that rotates in a rotational direction of the driving shaft, for restricting rotation of the sleeve, and is constructed such that the coil spring is formed such that the coil wire is wound around from the driving-shaft side toward the driven-shaft side in a winding direction opposite to that of the rotational direction of the driving shaft and the coil end on the driving-shaft side of the coil spring is engaged with the sleeve while the other coil end on the driven-shaft side of the coil spring is left free.

Further, a second feature of the invention resides in that the winding diameter of the coil end on the driven-shaft side of the coil spring is made greater than the winding diameter of the other part of the coil spring.

In accordance with a third feature of the invention, a spring clutch mechanism for selectively transmitting rotation of a driving shaft to a driven shaft through a coil spring, includes:

driving and driven shafts disposed opposite to each other on a common axis;

a coil spring formed of coil wire fitted on the driving and driven shafts, the coil spring being formed such that the coil wire is wound around from the driving-shaft side toward the driven-shaft side in a winding direction opposite to that of the rotational direction of the driving shaft;

a driving-side sleeve which is fitted over a part of the coil spring fitted on the driving shaft, engaged with the driving-side coil end of the coil spring and has a driving-side engaging portion formed in a site on the peripheral surface thereof;

a driven-side sleeve which is fitted over a part of the coil spring fitted on the driven shaft, engaged with the driven-side coil end of the coil spring and has a driven-side engaging portion formed in a site on the peripheral surface thereof;

a stopper which selectively engages the engaging portion of the driving-side sleeve to restrict rotation of the driving-side sleeve; and a link stopper which, in link with the stopper, selectively engages the engaging portion of the driven-side sleeve to restrict the rotation of the driven-side sleeve in the direction opposite to the rotational direction of the driving shaft.

In accordance with a fourth feature of the invention, a spring clutch mechanism for selectively transmitting rotation of a driving shaft to a driven shaft through a coil spring, includes:

driving and driven shafts disposed opposite to each other on a common axis;

a coil spring formed of coil wire fitted on the driving and driven shafts, the coil spring being formed such that the coil wire is wound around from the driving-shaft side toward the driven-shaft side in a winding direction opposite to that of the rotational direction of the driving shaft;

a driving-side sleeve which is fitted over a part of the coil spring fitted on the driving shaft, engaged with the driving-side coil end of the coil spring and has a driving-side engaging portion formed in a site on the peripheral surface thereof;

a driven-side sleeve which is fitted over a part of the coil spring fitted on the driven shaft, engaged with the driven-side coil end of the coil spring and has a driven-side engaging portion formed of a series of engaging segments circumferentially extending in a site on the peripheral surface thereof;

a stopper which selectively engages the engaging portion of the driving-side sleeve to restrict rotation of the driving-side sleeve; and a link stopper which, in link with the stopper, selectively engages the engaging portion of the driven-side sleeve to restrict the rotation of the driven-side sleeve in the direction opposite to the rotational direction of the driving shaft.

Next, fifth and sixth features of the invention reside in a configuration having the third or fourth feature, further including: a supporting member which when the stopper is not engaged with the driving-side engaging portion, supports the link stopper so as not to be engaged with the driven-side engaging portion, to keep the stopper and link stopper in the disengaged state.

In accordance with seventh through twelfth features of the invention, a configuration having one of the first through sixth features, is further characterized in that the coil spring has a circular section and the driving and driven shafts have a plurality of grooves circumferentially extending on their peripheral surface thereof over which the coil spring is fitted.

Next, in accordance with thirteen through eighteenth features of the invention, a configuration having one of the seventh through twelfth features, is further characterized in that the coil spring has a large-pitch portion over a position where the driving shaft and the driven shaft are opposed to each other.

In accordance with a nineteenth feature of the invention, a clutch mechanism for use in a paper feed device for feeding paper stacked on a tray one by one by rotating a feed roller, includes:

a driving shaft connected to a driving source;

a driven shaft disposed opposite to the driving shaft on a common axis with the driving shaft;

a feed roller fixed to the driven shaft;

a coil spring formed of coil wire fitted on the driving and driven shafts for selectively transmitting rotation of the driving shaft to the driven shaft therethrough, the coil spring being formed such that the coil wire is wound around from the driving-shaft side toward the driven-shaft side in a winding direction opposite to that of the rotational direction of the driving shaft;

a driving-side sleeve which is fitted over a part of the coil spring fitted on the driving shaft, engaged with the driving-side coil end of the coil spring and has a driving-side engaging portion formed in a site on the peripheral surface thereof;

a driven-side sleeve which is fitted over a part of the coil spring fitted on the driven shaft, engaged with the driven-side coil end of the coil spring and has a driven-side engaging portion formed in a site on the peripheral surface thereof;

a stopper which selectively engages the engaging portion of the driving-side sleeve to restrict rotation of the driving-side sleeve; and a link stopper which, in link with the stopper, selectively engages the engaging portion of the driven-side sleeve to restrict the rotation of the driven-side sleeve in the direction opposite to the rotational direction of the driving shaft.

Further, a twentieth feature of the invention resides in that the coil spring has a circular section of 0.6 to 0.7 mm in diameter.

Next, in accordance with twenty-first and twenty-second features of the invention, a configuration having the nineteenth or twentieth feature, is further characterized in that of the driving and driven shafts, at least the portions on which the spring coil is fitted is formed of a cylindrical feature having an outside diameter of about 0.1 to 0.3 mm greater than the inside diameter of the coil spring.

Further, in accordance with twenty-third through twenty-sixth features of the invention, a configuration having one of the nineteenth through twenty-second features, is further characterized in that the coil spring has a circular section and the driving and driven shafts have a plurality of grooves circumferentially extending on their peripheral surface thereof over which the coil spring is fitted.

Finally, in accordance with twenty-seventh through thirtieth features of the invention, a configuration having one of the twenty-third through twenty-sixth features, is further characterized in that the coil spring has a large-pitch portion over a position where the driving shaft and the driven shaft are opposed to each other.

Next, the operations as to the above configurations above will be briefly described.

In the above first configuration of the invention described, when the stopper is not engaged with the engaging portion of the sleeve, the sleeve is able to rotate freely. Since the coil end on the driving-shaft side of the coil spring fitted over both the driving shaft and the driven shaft is engaged with the sleeve, the coil end of the coil spring is able to rotate together with the sleeve in the direction opposite to the winding direction of the coil. As the coil end of the coil spring rotates in the direction opposite to the winding direction, the coil spring will grip the driving shaft and the driven shaft to transmit the rotation of the driving shaft to the driven shaft through the coil spring.

When the stopper engages the engaging portion of the sleeve, the rotation of the sleeve is restricted, therefore the rotation of the coil spring also is inhibited. In this state, if the driving shaft inside the coil spring starts to rotate in the opposite direction to the winding direction of the coil spring, the rotational force of the driving shaft causes the coil spring to expand its inside diameter, so that the coil spring is idly fitted on the driven shaft. As a result, the rotation of the driving shaft will not be transmitted to the driving shaft.

Since the coil end of the coil spring on the driven-shaft side is free, if the driven shaft rotates in the rotational direction of the driving shaft in the state that the rotation of the sleeve is prohibited by the stopper, the rotation of the driven shaft causes the coil spring to expand its inside diameter. Accordingly, the coil spring will be idly fitted on the driven shaft, therefore the driven shaft is allowed to freely rotate in the rotational direction of the driving shaft. In contrast, as the driven shaft rotates to the direction opposite to the rotational direction of the driving shaft, the rotation of the driven shaft causes the coil spring to reduce its inside diameter, whereby the coil spring that is inhibited together with the sleeve from rotating, grips the driven shaft by forming frictional engagement. As a result, the rotation of the driven shaft in the direction opposite to the rotational direction of the driving shaft is prohibited.

Therefore, it is possible to cause the coil spring to either idly hold or grip the driving shaft and driven shaft by engaging or disengaging the stopper with the engaging portion of the sleeve. That is, the rotation of the driving shaft can selectively be transmitted to the driven shaft via the coil spring. When the stopper is engaged with the engaging portion of the sleeve and therefore the coil spring is restricted from rotating, the driven shaft is prohibited from rotating in the direction opposite to the rotational direction of the driving shaft. That is, the driven shaft is allowed to freely rotated only in the rotational direction of the driving shaft, thus realizing the function of one-way clutch.

In the above second configuration of the invention, the coil end on the driven-shaft side of the coil spring is greater in its winding diameter than the other part of the coil spring. Accordingly, the free coil end of the coil spring on the driven-shaft side will not come into sliding contact with the peripheral surface of the driven shaft.

In the above third configuration of the invention described, when the stopper and the link stopper are in disengagement with the driving-side engaging portion of the driving-side sleeve and the driven-side engaging portion of the driven-side sleeve, respectively, the driving-side sleeve, the driven-side sleeve and the coil spring freely will rotate. Accordingly, the coil spring grips the driving shaft and driven shaft by making frictional engagement therewith, whereby the rotation of the driving shaft is transmitted to the driven shaft via the coil spring while the rotation of the driven roller in the direction opposite to the rational direction of the driving shaft is restricted. In this condition, if the driven shaft rotates faster in the rotational direction of the driving shaft than the driving shaft, the rotational force of the driven shaft causes the coil spring to expand its inside diameter, whereby the coil spring is made to idly fitted on the driven shaft. Therefore, it is possible for the driven shaft to rotate faster in the same direction with that of the driving shaft than the driving shaft.

When the stopper is engaged with the driving-side engaging portion of the driving-side sleeve and the link stopper is engaged with the driven-side engaging portion of the driven-side sleeve, the driving-side sleeve and the coil end of the coil spring on the driving side are restricted from rotating. The rotation of the driving shaft causes the coil spring to expand its inside diameter so that the coil spring is idly fitted on the driving shaft. As result, the rotation of the driving shaft will not be transmitted to the driven shaft. Since the rotational force caused by the rotation of the driving shaft to expand the inside diameter of the coil spring is transmitted to the whole coil spring, the driven shaft is able to freely rotate also in the rotational direction of the driving shaft.

On the other hand, since the link stopper engages the driven-side engaging portion of the driven-side sleeve, the coil end of the coil spring on the driven side as well as the driven-side sleeve is restricted from rotating in the direction opposite to the rotational direction of the driving shaft. In this condition, if the driven shaft rotates in the direction opposite to the rotational direction of the driving Shaft, the rotational force of the driven shaft causes the coil spring to expand its inside diameter, whereby the coil spring is idly fitted on the driven shaft. As a result, the driven shaft freely rotates in the opposite direction to the rotational direction of the driving shaft. Since the force produced by the rotation of the driving shaft to expand the inside diameter of the coil spring is continuously transmitted to the whole part of the coil spring, this also allows the driven shaft to freely rotate in the rotational direction of the driving shaft.

Therefore, it is possible to cause the coil spring to either idly hold or grip the driving shaft and driven shaft by engaging or disengaging the stopper with the driving-side engaging portion. That is, the rotation of the driving shaft can selectively be transmitted to the driven shaft via the coil spring. When the stopper is in disengagement with the driving-side engaging portion, the driven shaft is allowed to freely rotate only in the rotational direction of the driving shaft, thus making it possible to realize the function of one-way clutch. Further, when the stopper is engaged with the driving-side engaging portion, the link stopper will engage the driven-side engaging portion whereby the driven shaft is allowed to freely rotate in both directions.

In the above fourth feature of the invention, the driven-side engaging portion of the driven-side boss is formed of a series of engaging segments arranged around an ideal design position as a center where the link stopper should be engaged. Accordingly, even if the position of the driven-side engaging portion actually formed on the driven-side boss deviates from the position of the driving-side engaging portion formed on the driving-side boss due to dimensional errors such as of the inside diameter, the number of turns in the coil spring, the outside diameters of the driving-side boss and the driven-side boss and the like, the link stopper will engage with the driven-side boss as long as the error falls within a certain range.

In the above fifth and sixth features of the invention, in a state where the solenoid is turned off, the link stopper is kept away from the driven-side engaging portion until the driven-side sleeve makes one revolution together with the driving-side sleeve. Accordingly, if the solenoid is turned off right after the driving-side engaging portion has passed by the stopper as the driving-side boss rotates, it is possible to avoid the generation of the clicking noise and abrasion due to the contact between the link stopper and part of driven-side engaging portion formed with a series of engaging segments.

In the above seventh through twelfth and twenty-third through twenty-sixth features of the invention, the coil spring has a circular section and a multiple number of grooves formed on the peripheral side of the driving and driven shafts will come in contact with the coil spring with a circular section. Accordingly, it is possible to form the coil spring of a relatively inexpensive material as well as to produce enough great frictional contact between the coil spring and the driving and driven shafts to transmit rotation of the driving shaft to the driven shaft.

In the above thirteenth through eighteenth and twenty-seventh through thirtieth features of the invention, the coil spring has a greater pitch portion over a position where the driving shaft and the driven shaft are opposed to each other as compared to the other part. Accordingly, the coil spring will not plunge into a gap between the driving and driven shafts.

In the above nineteenth feature of the invention, the clutch mechanism described in the third feature is applied to a paper feeding device which causes a feed roller to rotate and feed the paper stacked on a tray one by one. Accordingly, when transmission of the driving force to the feed roller is stopped, the feed roller is rotatable in both the forward and reverse directions.

In the above twentieth feature of the invention, the sectional diameter of the coil spring is determined by considering if a sufficient amount of driving force can be transferred to the feed roller for paper feeding by using a coil spring with a circular section.

In the above twenty-first and twenty-second features of the invention, the relation between the outside diameters of the driving and driven shafts and the inside diameter of the coil spring is set up in such a manner as to allow the driven shaft to be idly held by the coil spring so that the feed roller may be rotated in both the forward and reverse directions when transmission of driving force to the feed roller is stopped.

BRIEF DESCRIPTION OF THE DRAWINGS

FIG. 8B is a chart of an experimental result showing torque characteristics of coil springs depending on the inside diameter of the coil springs used for the same spring clutch;

FIG. 9 is a chart of an experimental result showing grip-toque characteristics with the passage of time, dependent on materials and surface states of a boss used for the same spring clutch;

DESCRIPTION OF THE PREFERRED EMBODIMENTS

Figure 1:
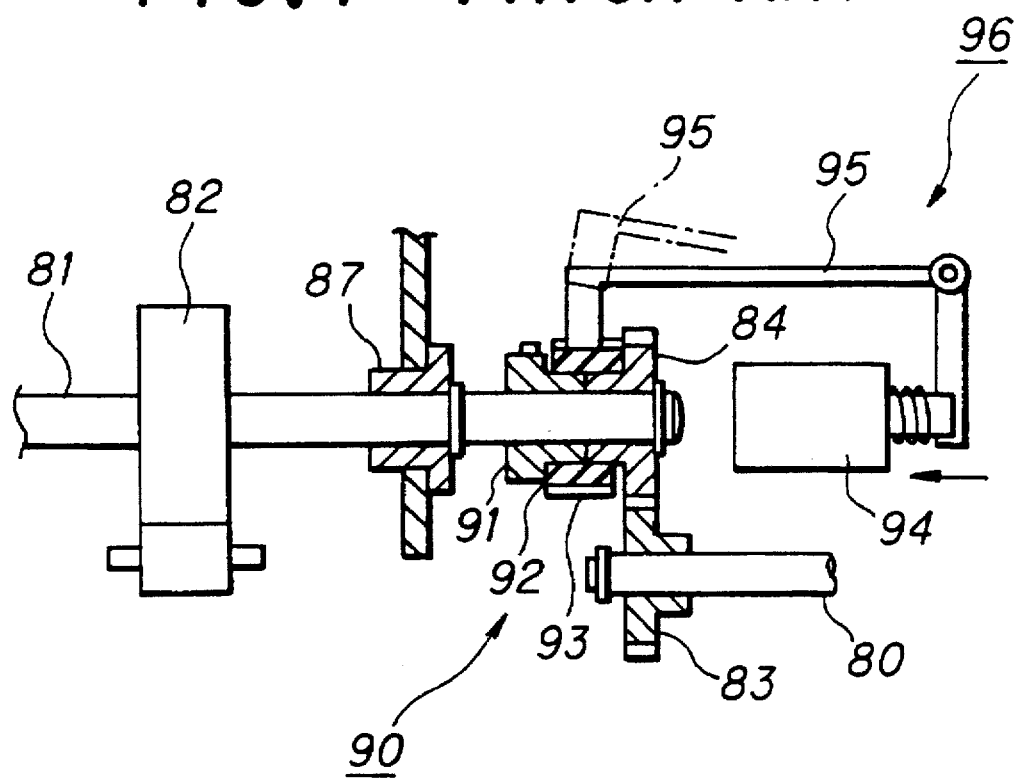
FIG. 1 is a view showing a configuration of a conventional spring clutch mechanism.
Figure 2:
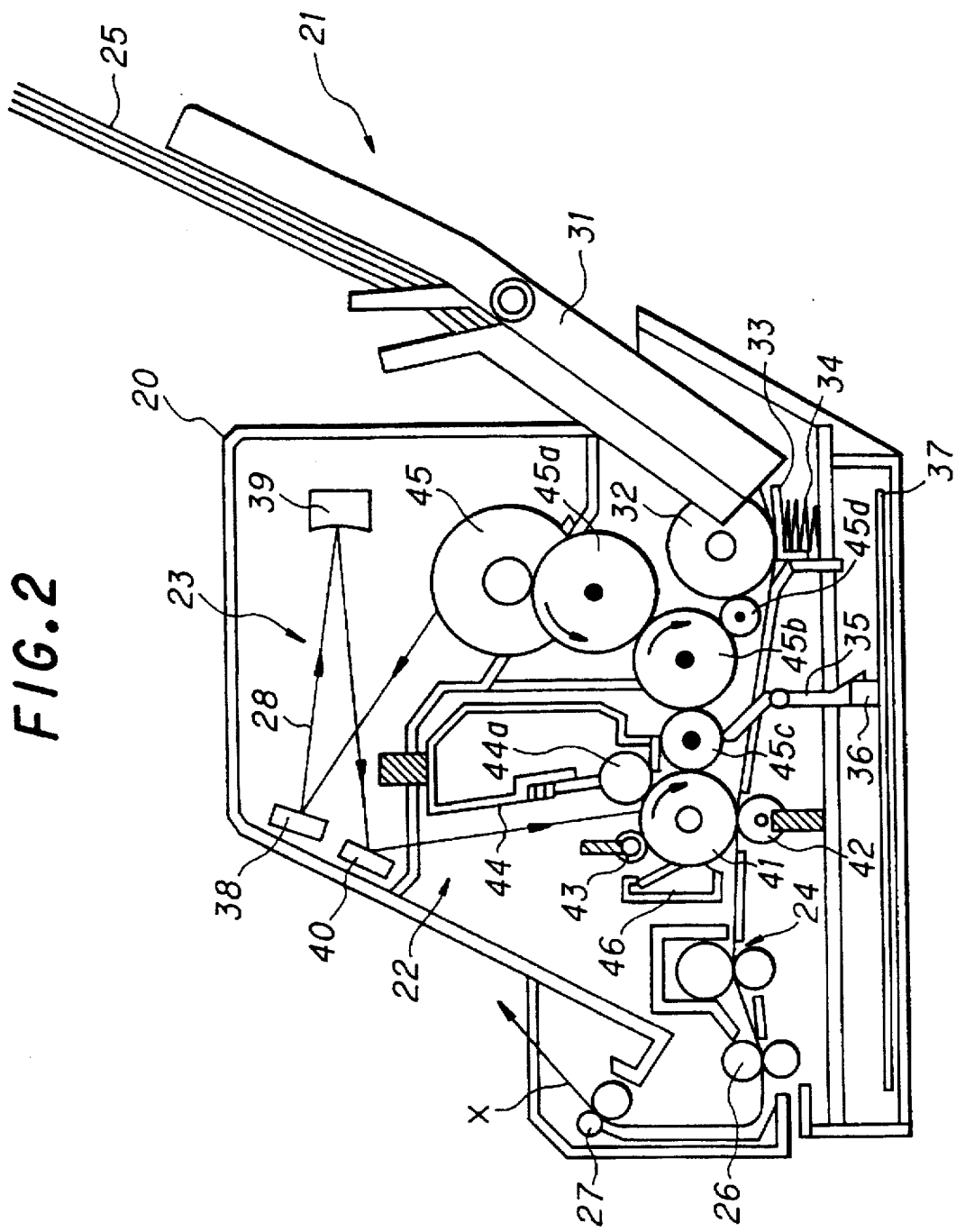
FIG. 2 is a view showing a configuration of a laser printer to which a paper feeding device using a spring clutch mechanism of an embodiment of the invention is applied.

FIG. 2 is a view showing a configuration of a laser printer to which a paper feeding device using a spring clutch mechanism of an embodiment of the invention is applied. A laser printer 20 includes a paper feed portion 21, an image forming unit 22, a laser scanner unit 23, a fixing unit 24. The paper feed portion 21 conveys a copy sheet 25 to the image forming unit 22 inside the laser printer 20. The image forming unit 22 transfers a toner image to the copy sheet 25 fed to produce an image. The copy sheet 25 is further drawn into the fixing unit 24 where the toner is fixed on the copy sheet 25. Then, the copy sheet 25 is discharged outside the laser printer 20 by means of the paper conveying rollers 26 and 27. That is, the copy sheet 25 advances through the passage in the direction indicated by an arrow X in the figure.

The paper feed portion 21 includes a paper feed tray 31, a feed roller 32, a paper separating friction plate 33, a pressing spring 34, a paper detecting actuator 35, a paper detecting sensor 36 and a controlling circuit 37. Copy sheets 25 stacked on the paper feed tray 31 are delivered one by one by the actions of the feed roller 32, paper separating friction plate 33 and pressing spring 34, all disposed below the paper feed tray 31, to the inside of the laser printer 20. The thus delivered copy sheet 25 brings down the paper detecting actuator 35 and causes the paper detecting sensor 36 to output the information as an electric signal to instruct the start of image printing. The controlling circuit 37 activated by the operation of the paper detecting actuator 35 outputs the image signal to an unillustrated laser light emitting diode of the laser scanner unit 23 to perform on/off control of the light emitting diode.

The above laser scanner unit 23 includes reflection mirrors 38 through 40 in addition to the laser light emitting diode. In FIG. 2, a laser beam 28 emitted from the laser light emitting diode deflects in a perpendicular direction to the document of the figure. Accordingly, the laser beam 28 reaches a photoreceptor 41 in the image forming unit 22 through the reflection mirror 38 to 40 and is made to deflect in the perpendicular direction to the document of the figure to scan the photoreceptor 41. During the operation, the laser beam 28 selectively illuminates the surface of the photoreceptor 41 based on the on/off information supplied from the controlling circuit 37.

The above image forming unit 22 includes the photoreceptor 41, a transfer roller 42, a charger 43, a developing unit 44 with a developing roller 44a, a motor 45 and a cleaning unit 46. The laser beam 28 selectively discharges the surface charges on the photoreceptor 41 which has been previously electrified by the charger 43 to create an electrostatic latent image on the photoreceptor 41. Toner used for development is stored in the developing unit 44. The toner properly agitated and electrified inside the developing unit 44 adheres on the surface of the developing roller 44a. Toner particles thus adhered on the developing roller create a toner image on the photoreceptor 41 in accordance with the static latent image by the action of electric fields created by the developing bias voltage applied to the developing roller 44a and the surface potential of the photoreceptor 41.

The copy paper 25 delivered to the image forming unit 22 by the paper feed portion 21 is conveyed as being nipped between the photoreceptor 41 and the transfer roller 42. The toner on the surface of the photoreceptor 41 is electrically attracted and transferred to the copy sheet 25 by the action of the electric fields produced by a transfer voltage applied to the transfer roller 42. At this moment, the toner on the photoreceptor 41 is transferred to the copy paper 25 by the transfer roller 42 while the untransferred toner remaining on the photoreceptor is collected by the cleaning unit 46. Thereafter, the copy sheet 25 is conveyed to the fixing unit 24 where the sheet is heated and pressed, whereby the toner is fused and fixed onto the copy sheet 25 to form a fixed solid image. The copy sheet 25 is then conveyed by the paper conveying rollers 26 and 27 to be discharged outside the laser printer 1.

In the image forming unit 22, the cleaning unit 46, charger 43 and developing unit 44 are disposed in contact with the peripheral surface of the photoreceptor 41 in that order from the upstream side as to the rotating direction of the photoreceptor 41. Specifically, a blade of the cleaning unit 46, a charging brush of the charger 43 and the developing roller 44a of the developing unit 44 are in contact with the photoreceptor 41. The transfer roller 42 is disposed at a position opposite the photoreceptor 41 in contact therewith so that the conveyed copy sheet 25 is nipped therebetween.

There are two steps of gears in the photoreceptor 41; one is to receive the driving force from the motor 45 through gears 45a to 45c and the other is to drive the transfer roller 42. As the motor 45 is driven, the gear 45a turns counterclockwise in the figure. The rotation of the gear 45a turns the gear 45b clockwise, whereby the gear 45c is rotated in the counterclockwise direction. This series of operation drives the photoreceptor 41 in the clockwise direction. Here, the developing unit 44 is driven by an unillustrated driving gear assembly.

The rotation of the gear 45b is transmitted to the feed roller 32 through the a gear 45d. The feed roller 32 is provided with a spring clutch mechanism which will be described hereinbelow. The feed roller 32 is selectively rotated clockwise through the spring clutch mechanism.

Figure 3:
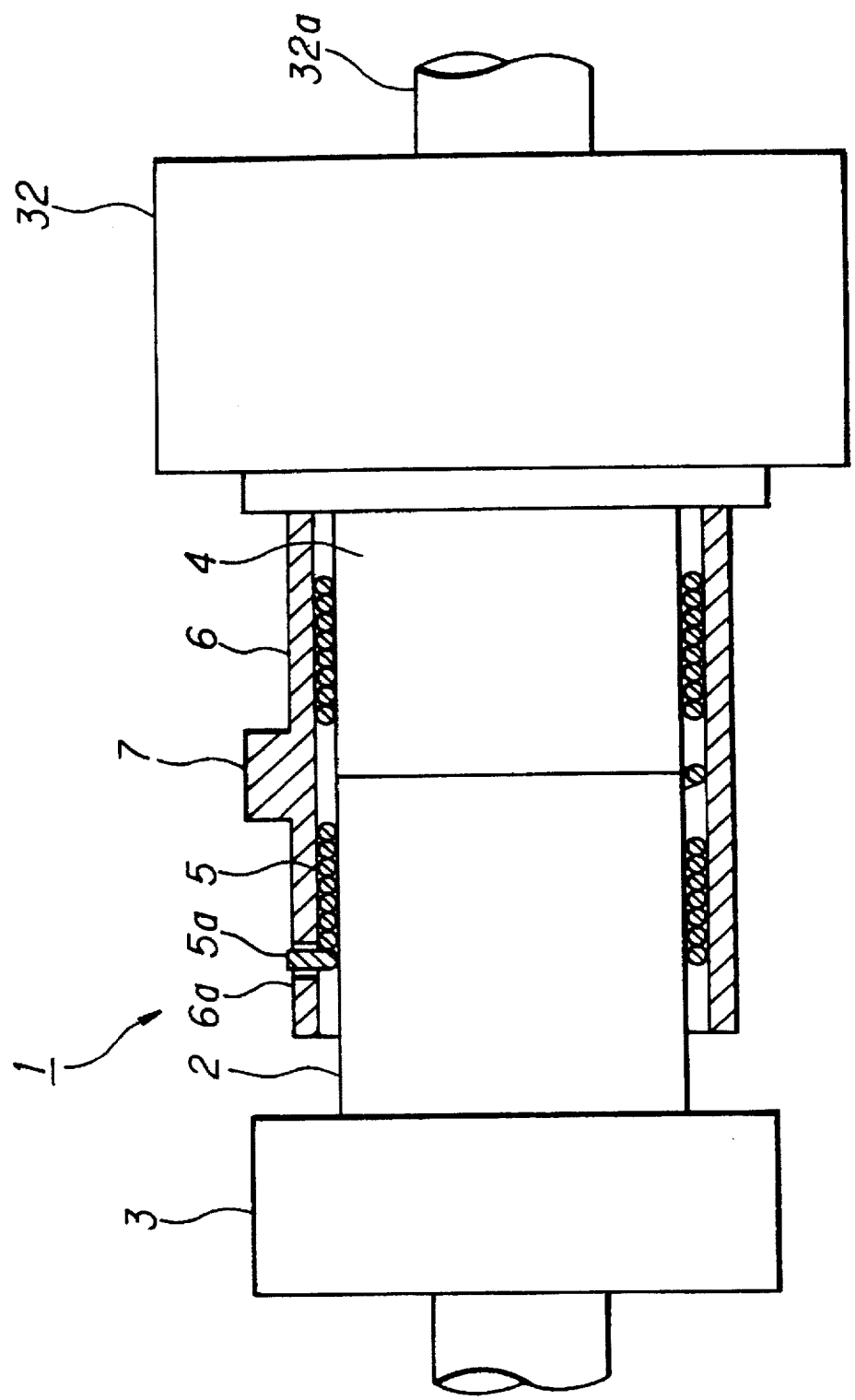
FIG. 3 is a sectional view showing a spring clutch in accordance with an embodiment of the invention described in the first feature.
Figure 4:
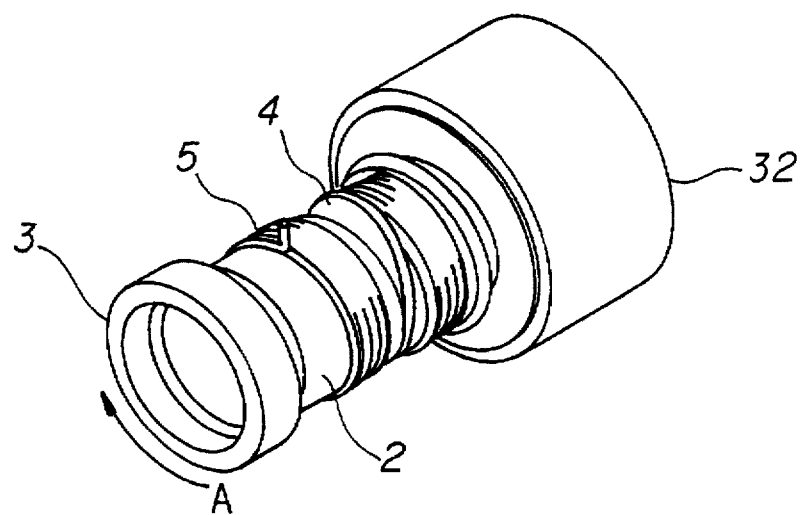
FIG. 4 is an appearance view of the same spring clutch with a sleeve removed.
Figure 5:
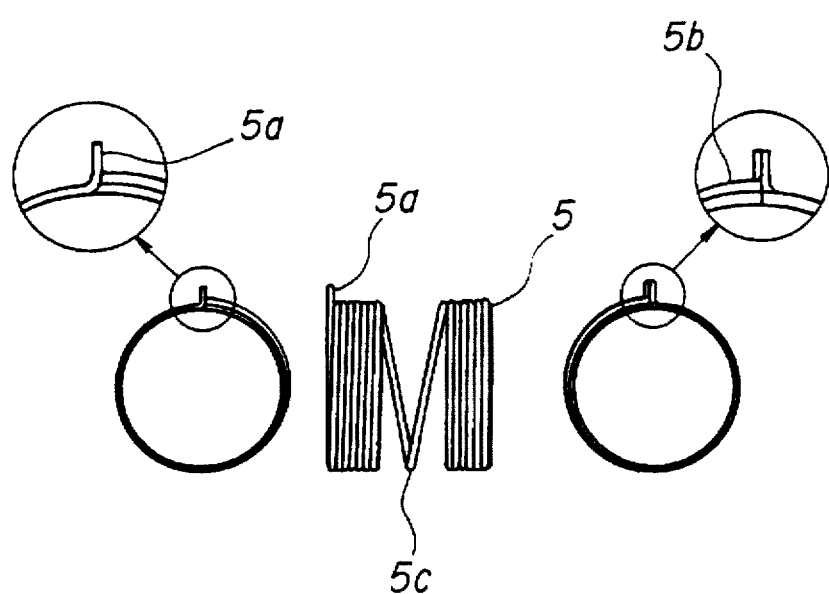
FIG. 5 is a view showing a shape of a coil spring used in the same spring clutch.

FIG. 3 is a sectional view showing a spring clutch in accordance with a first embodiment of the invention written in the first feature. FIG. 4 is an appearance view of the same with a sleeve removed. FIG. 5 is a view showing a shape of a coil spring. A spring clutch 1 includes a driving-side boss 2 having a cylindrical shape integrally formed with a driving gear 3 and a driven-side boss 4 with a feed roller 32 fixed thereto. These bosses 2 and 4 are arranged on a common axis so as to be opposed to each other. A coil spring 5 is fitted in a gripping manner on the peripheral side of the driving-side boss 2 and driven-side boss 4. The spring clutch 1 further has a sleeve 6 fitted over the coil spring 5. The sleeve 6 has an engaging hole 6a with which a driving-side coil end 5a of the coil spring 5 is engaged. A projection 7 as an engaging portion of the invention is formed in the central part on the peripheral surface of the sleeve 6. The feed roller 32 together with the driven-side boss 4 is fixed to a rotary shaft 32a while the driving-side boss 2 integrated with the driving-side pear 3 is rotatably supported by the rotary shaft 32a.

As shown in FIG. 5, the coil spring 5 is wound counter-clockwise from the driving-side boss 2 toward the driven-side boss 4 with a large-pitch portion 5c in the middle part thereof in which one wind with a pitch of 4 to 6 mm is formed. The large-pitch portion 5c is positioned in an area where the driving-side boss 2 and the driven-side boss 4 faces each other. This portion 5c is formed to prevent partial entrance of the coil spring 5 into between the driving-side boss 2 and driven-side boss 4. A coil end 5a on the driving side of the coil spring 5 is bent outward and this bent portion is engaged with the engaging hole 6a of the sleeve 6. The other coil end 5b on the driven side of the coil spring 5 is not engaged with either the driven-side boss 4 or the sleeve 6 and left free.

The coil diameter in the vicinity of the driven-side coil end 5b of the coil spring 5 is made greater than the other part of the coil spring. This configuration prevents the driven-side coil end 5b of the coil spring 5 from frictionally sliding on the peripheral surface of the driven-side boss 4 and therefore prevents damages to the peripheral surface of the driven-side boss 4. As shown in FIG. 4, rotational force in the clockwise direction (in the direction indicated by an arrow A) viewed from the driving gear 3 side is transmitted to the driving gear 3 through an unillustrated transmission gear. Accordingly, the coil spring 5 is wound in the opposite direction to that of the rotating direction of the driving gear 3 and the driven-side boss 2.

Figure 6:
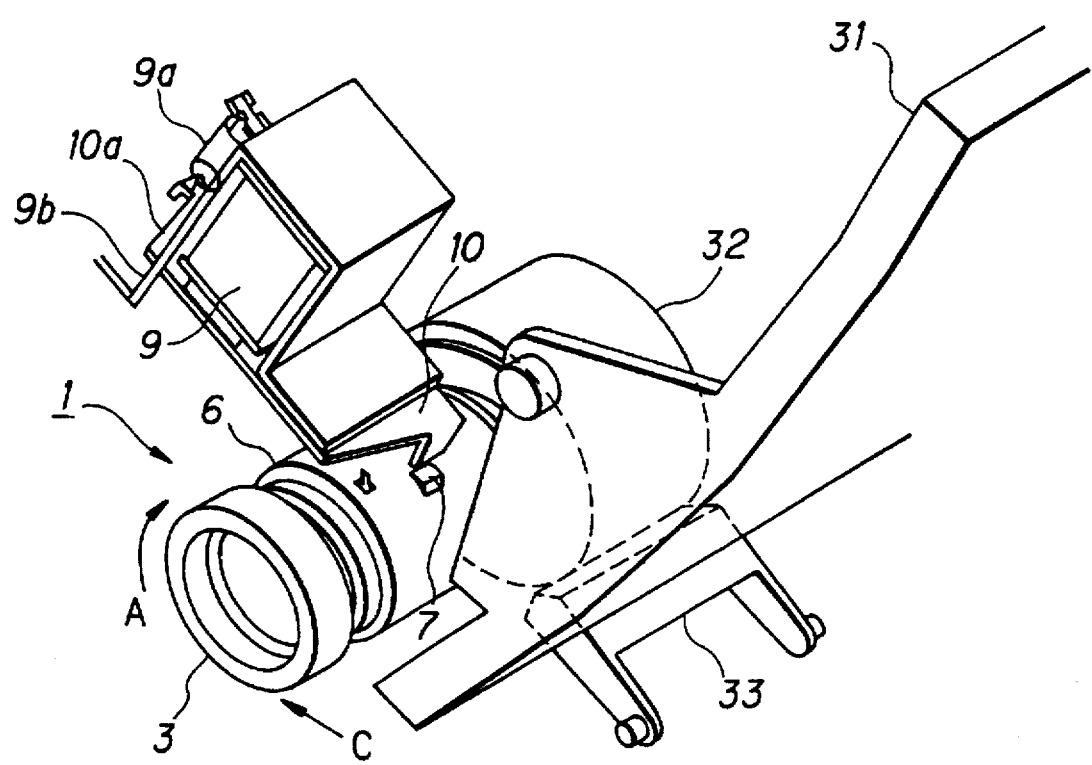
FIG. 6 is a view showing the same spring clutch in its using state.

FIG. 6 is a view showing the spring clutch in its using state. This figure shows a state where the spring clutch 1 is applied to the paper feed portion 21 in the laser printer 20 shown in FIG. 2. The spring clutch 1 selectively transmits the rotation of the driving gear 3 in the direction indicated by an arrow A to the feed roller 32 so as to convey a copy sheet placed on the paper feed tray 31 through a nip formed with the paper separating friction plate 33 in the direction indicated by an arrow C. A moveable plate 10 serving as a stopper of the invention is disposed opposite to the peripheral surface of the sleeve 6 of the spring clutch 1. In this moving plate 10, at least the portion opposing a solenoid 9 is formed of a magnetic substance, so that the plate 10 can be brought into or out of contact with the peripheral surface of the sleeve 6 by the presence or absence of the magnetic attracting force depending on the on/off state of the solenoid 9. Detailedly, in the moving plate 10 a spring 9a is hooked at a rear portion 10a projected through an attachment 9b of the solenoid 9 so that the elastic force of the spring 9a urges the moving plate 10 toward the sleeve 6. As the solenoid 9 is turned on, the magnetic attracting force draws the moving plate 10 to the solenoid 9 side by resisting the elastic force of the spring 9a.

Figure 7A:
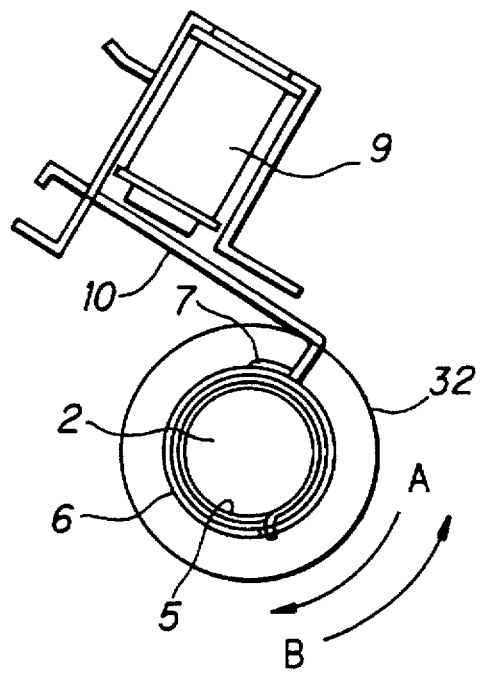
FIG. 7A is a view showing an initial operation state of the spring clutch shown in FIGS. 3 through 6.
Figure 7B:
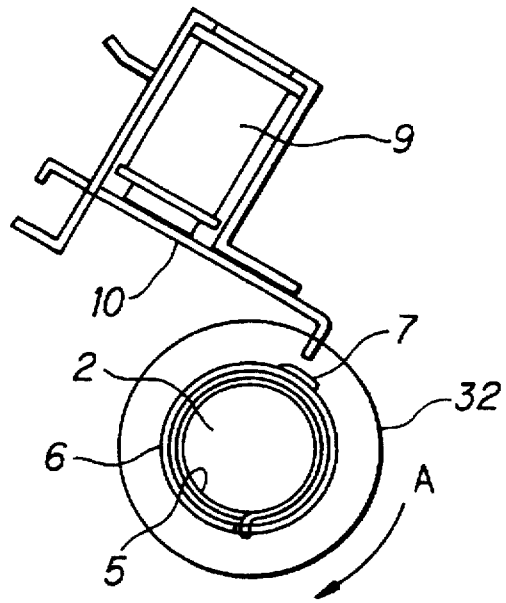
FIG. 7B is a view showing the following operation state of the spring clutch shown in FIG. 7A.
Figure 7C:
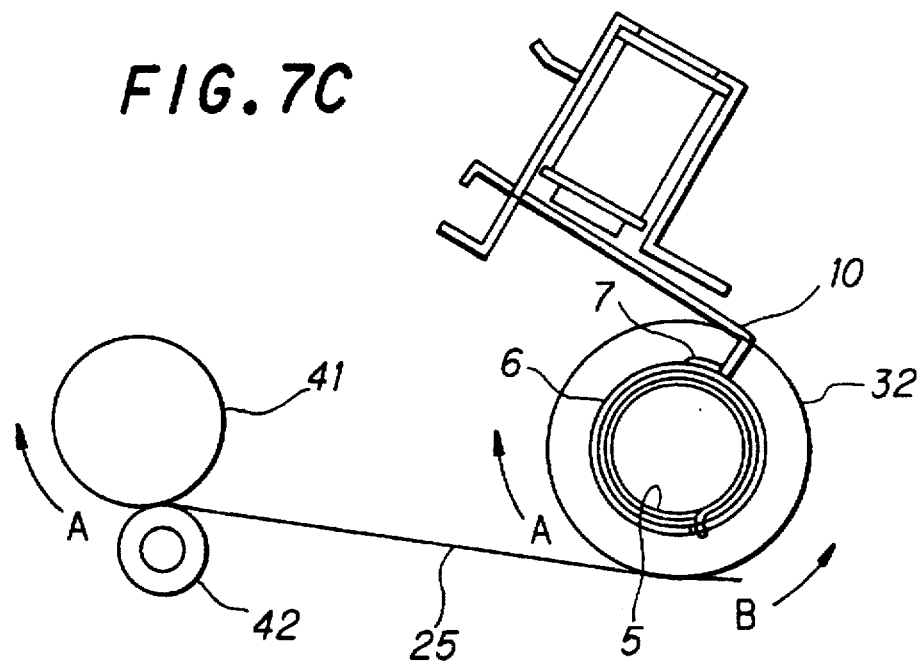
FIG. 7C is a view showing the following operation state of the spring clutch shown in FIG. 7B.

FIGS. 7A, 7B and 7C are diagrams showing operational states of the above spring clutch. In the state where the solenoid 9 is turned off, the moving plate 10 is set at a down position as shown in FIG. 7A, so that the bent portion of the moving plate 10 comes in contact with the central portion of the peripheral surface of the sleeve 6. As mentioned above, the projection 7 is formed in the center of the peripheral surface of the sleeve 6. Accordingly, the bent portion of the moving plate 10 abuts the projection 7 which rotates in the direction of an arrow A. This abutment prohibits the sleeve 6 from rotating in the direction of arrow A. In the case where the solenoid 9 is turned on, the moving plate 10 is magnetically attracted by the solenoid 9 and therefore set at an upper position as shown in FIG. 7B. Therefore, the bent portion of the moving plate 10 will not abut the projection 7 rotating in the direction of an arrow A so that the sleeve 6 can rotate freely.

As shown in FIG. 7B, in the state where the sleeve 6 is able to rotate freely, the coil spring 5 with the driving-side coil end 5a engaged with the sleeve 6 also rotates freely. Therefore, the fitted and gripping state of the coil spring 5 to the driving-side boss 2 and the driven-side boss 4 is maintained. Accordingly, the rotation of the driving-side boss 2 in the direction of arrow A is transmitted to the driven-side boss 4 through the coil spring 5 to thereby rotate the feed roller 32 clockwise or in the paper feeding direction (in the direction of arrow A). In contrast, if the rotation of the sleeve 6 in the direction of arrow A is prohibited as shown in FIG. 7A, the coil spring 5 with the driving-side coil end 5a engaged with the sleeve 6 is inhibited from rotating. As a result, the rotation of the driving-side boss 2 in the direction of arrow A, that is, in the direction opposite to the winding direction of the coil spring 5, causes the coil spring 5 to expand its inside diameter. This augment of the diameter of the coil spring 5 causes the coil spring 5 to be idly fitted on the driving-side boss 2, whereby the rotation of the driving-side boss 2 in the direction of arrow A will not be transmitted to the driven-side boss 4.

In the state shown in FIG. 7A or in the state where the rotation of the driving-side boss 2 is not transmitted to the driven-side boss 4, if the driven-side boss 4 is rotated in the direction of arrow A by an external force, this rotation causes the coil spring 5 to expand its inside diameter because the direction of the rotation is opposite to the winding direction of the coil spring 5. Therefore, the coil spring 5 idles the driven-side boss 4, so as to allow the driven-side boss 4 to freely rotate in the direction of arrow A. On contrary, if the driven-side boss 4 is tried to rotate in the direction of arrow B, this rotation causes the coil spring 5 to reduce its inside diameter because the rotation is in the same direction with the winding direction of the coil spring 5. Accordingly, the coil spring 5 grips the driven-side boss 4, so that the driven-side boss 4 will not freely rotate in the direction of arrow B. Thus, it is possible to construct a one-way clutch structure which allows the driven-side boss 4 to rotate only in the direction of arrow A but prohibits the rotation in the direction of arrow B.

By the operation described heretofore, in the case where the copy paper is fed from the paper feed portion using the spring clutch 1, if the solenoid 9 is turned on from the state shown in FIG. 7A, the moving plate 10 moves upward so as not to abut the projection 7, as shown in FIG. 7B, whereby the restriction on the rotation of the sleeve 6 and coil spring 5 in the direction of arrow A is canceled. The cancellation of the restriction of the rotation allows the rotation of the driving-side boss 2 to be transmitted to the driven-side boss 4 whereby the feed roller 32 is rotated in the direction of arrow A.

When the projection 7 passes by the bent portion of the moving plate 10, the solenoid 9 is turned off. This causes the moving plate 10 to move downward and come in contact with the peripheral surface of the sleeve 6, but the projection 7 will not abut the bent portion of the moving plate 10 until the sleeve 6 makes one revolution, therefore, the feed roller 32 continuously rotates during the interval.

As the feed roller 32 has made one rotation and the copy paper 25 reaches the nip between the photoreceptor 41 and the transfer roller 42 as shown in FIG. 7C, the projection 7 abuts the bent portion of the moving plate 10, whereby the rotation of the sleeve 6 and the coil spring 5 is restricted so that the rotation of the driving-side boss 2 will not be transmitted to the feed roller 32.

At this moment, if the moving speed of the copy paper 25 is greater than the speed of the peripheral surface of the transfer roller 42, the copy paper 25 will receive a reaction force when the front end of the paper abuts the transfer roller 42. This reaction force generates a rotational force on the feed roller 32 in the direction of arrow B. Even in such a case, since the driven-side boss 4 with the feed roller 32 fixed thereto is inhibited from rotating in the direction of arrow B, it is possible to reliably prevent the copy paper 25 from moving backward and therefore avoid a conveyance failure at the transfer roller 42.

Suppose that the feed roller 32 stops rotating with the medium portion or the rear end of the copy paper 25 in contact with the feed roller 32 when the front end of the copy paper 25 abuts the transfer roller 42. Even in such a case, since the driven-side boss 4 with the feed roller 32 fixed thereto is able to freely rotate in the direction of arrow A, if the transfer roller 42 rotates in the direction of arrow A, it is possible to smoothly convey the copy sheet 25 as the feed roller 32 turns in the direction of arrow A.

For the coil spring 5, the driving force transmitting torque (to be referred to as a grip torque) when the coil is constricted is preferably made large while the sliding torque (to be referred to as a slip torque) when the coil is extended is preferably made small. For this reason, conventional spring clutches have used coil springs made up of high carbon steel wire rods for spring (SWC material) having a square section in order to secure a high frictional coefficient and prevent the deformation of the coil due to fatigue caused by repeated loads.

However, coil springs having square-sections made of SWC material are expensive and require a complicated anti-corrosive treatment or surface treatment, resulting in markedly increased cost. Further, the coil springs of this kind require complicated design control as well as quality control of parts, such as strictly maintaining the dimensional accuracy of parts (for example, the dimensional tolerance of the inside diameter of a coil spring and the outside diameter of a mating boss should be maintained within about 0.05).

Figure 8A:
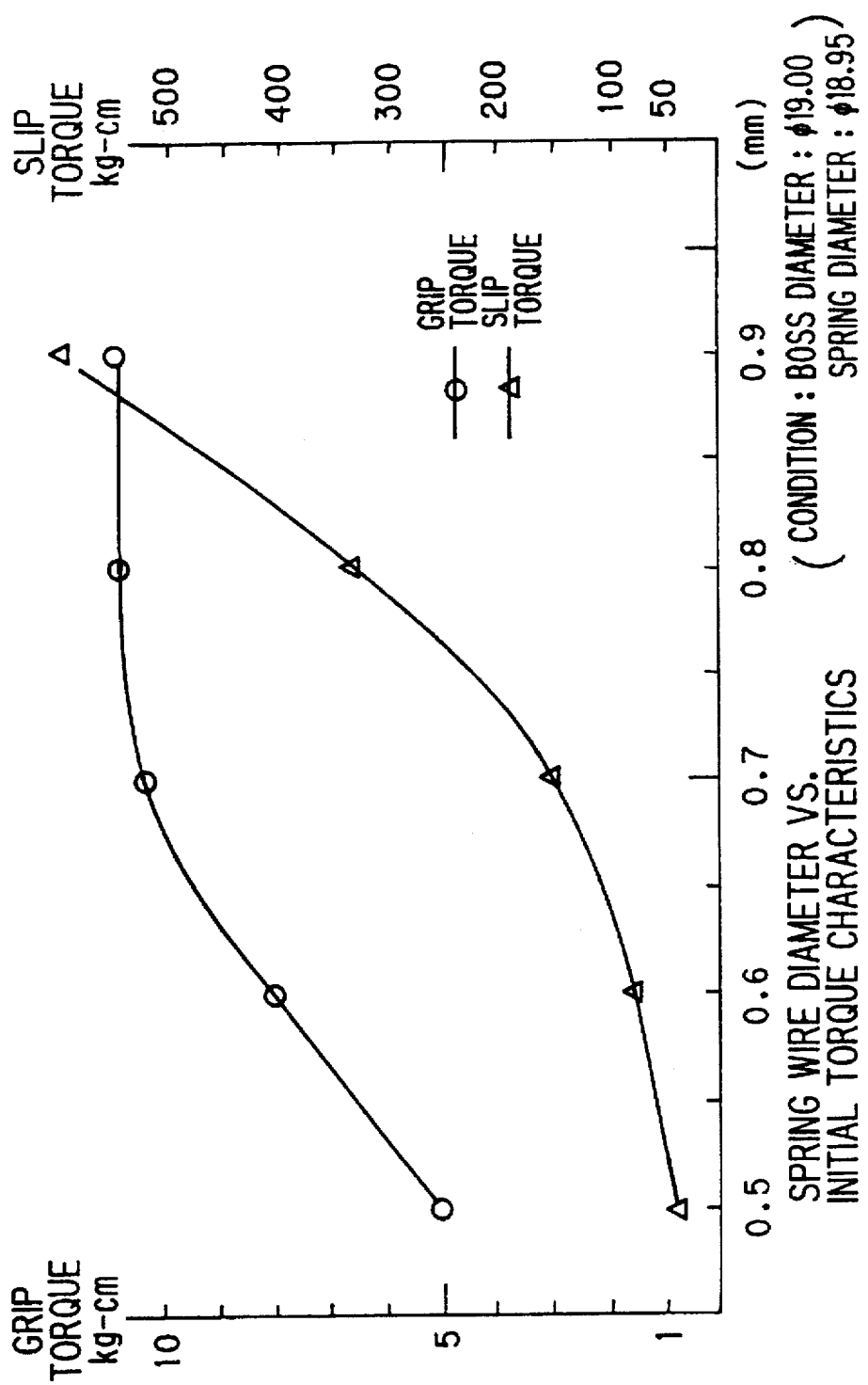
FIG. 8A is a chart of an experimental result showing torque characteristics of coil springs depending on the wire diameter of the coil springs used for the spring clutch shown in FIGS. 3 through 7C.

To overcome the above problem, this embodiment uses a coil spring made up of Ni-plated piano wire having a circular section. Based on the experimental result shown in FIG. 8A, a preferable wire diameter of the coil spring with a circular section is 0.6 to 0.7 mm in order to obtain as a sufficient grip torque for conveying paper as 5 Kg cm or more and realize a low slip torque for allowing free rotations of the driven-side boss. The inside diameter of the coil spring should be smaller by about 0.1 to 0.3 mm than the outside diameter of the mating boss based on the experimental result shown in FIG. 8B.

Since it is no more necessary for this embodiment to provide a separate one-way clutch having an iron core abutting the rotary shaft 32a of the feed roller 32, the rotary shaft is not necessarily made of a metal. Accordingly, there is no need of using iron sintered alloys for forming the driving-side boss 2 which is rotatably supported by the rotary shaft 32a. Therefore, in this embodiment, the driving gear 3 which typically is made up of a resin and the driving-side boss 2 may and will be integrally formed of a resin.

A preferable material for forming the driving pears 3 and driving-side boss 2 is a PPS (polyphenylene sulfide) reinforced by 60% in strength by adding glass fibers, based on the experimental result of time-dependent characteristics as to the grip torque, shown in FIG. 9. Further, by providing a large number of grooves in a pitch of about 0.1 to 0.3 mm circumferentially extending on the peripheral surface of the driving-side boss 2 so that the surface roughness is 1.6 to 3.2 μm (represented in terms of Ra (center line average height), it is possible to improve the time-dependent characteristics of the grip torque. It is also possible to construct the driven-side boss 4 in the similar configuration. Particularly, since the coil end 5b of the coil spring 5 is left free in the driven-side boss 4, the coil spring 5 used to easily move along the rotary shaft. The provision of a large number of circumferential grooves on the peripheral surface of the driven-side boss 4 is capable of regulating the movement of the coil spring by the frictional contact.

Thus, in the present invention, since the driving-side boss 2 and driving gear 3 are integrally formed of a resin material, the material cost can be reduced because expensive materials such as iron sintered alloys etc., are not used. Further, the assembling operation can be simplified because there is no need to effect insert-molding or screw-fitting for uniting a metallic boss with a resin gear. As a result, a remarkable reduction in cost can be realized.

Figure 10:
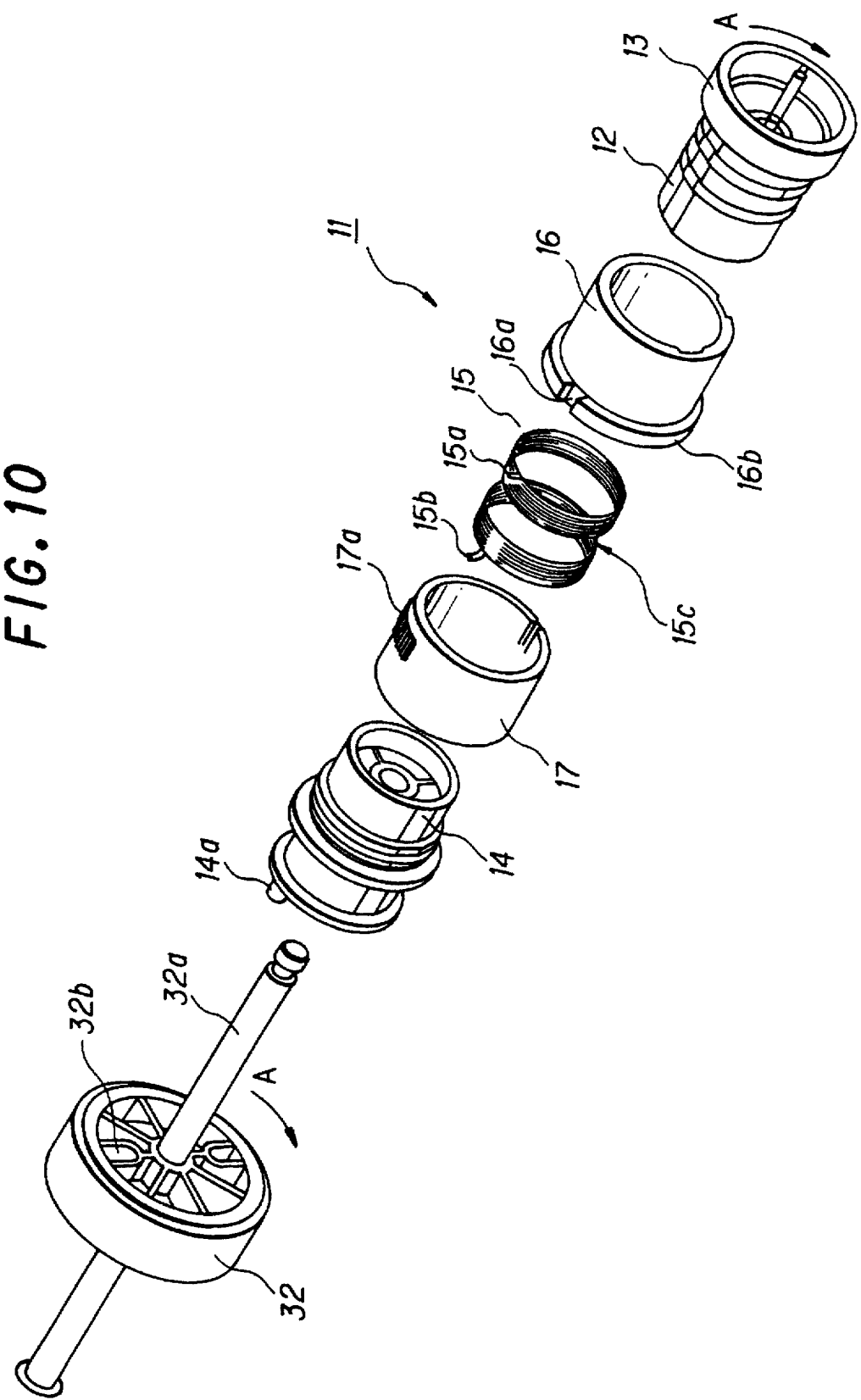
FIG. 10 is an exploded diagram of a spring clutch in accordance with an embodiment described in the third feature of the invention.

FIG. 10 is an exploded diagram of a spring clutch in accordance with an embodiment of the third feature of the invention. A spring clutch 11 includes a driving-side boss 12 having a cylindrical shape integrally formed with a driving gear 13 and a driven-side boss 14 which integrally rotates with a rotary shaft 32a with a feed roller 32 fixed thereon. These bosses 12 and 14 are arranged on a common axis so as to be opposed to each other. A coil spring 15 is fitted in a gripping manner on the peripheral side of the driving-side boss 12 and driven-side boss 14. The spring clutch 11 further has a driving-side sleeve 16 and a driven-side sleeve 17 both fitted over the coil spring 15. A driving-side coil end 15a of the coil spring 15 is engaged with the driving-side sleeve 16 while a driven-side coil end 15b of the coil spring 15 is engaged with the driven-side sleeve 17. The engagement of the driving-side coil end 15a with the driving-side sleeve 16 is made by fitting a bent portion of the driving-side coil end 15a into an unillustrated hole formed in the driving-side sleeve 16, as in the same manner practiced in the embodiment shown in FIG. 3. The engagement of the driven-side coil end 15b with the driven-side sleeve 17 is performed similarly by fitting a bent portion of the driven-side coil end 15b into an unillustrated hole formed in the driven-side sleeve 17.

A rib 16b as a holding member in the invention is formed at the driving-side end on the peripheral surface of the driving-side sleeve 16. A part of the rib 16b is cut away so as to form a recess 16a as a driving-side engaging portion in the invention. A toothed portion 17a having a series of teeth serving as driven-side engaging portions in the invention is continuously formed on the peripheral side of the driven-side sleeve 17.

The rotary shaft 32a with the feed roller 32 fixed thereon axially supports the driving-side boss 12 and the driven-side boss 14. The driven-side boss 14 has a projection 14a which engages a recess 32b in the feed roller 32. This engagement allows the driven-side boss 14 to rotate integrally with the feed roller 32 and the rotary shaft 32a. The driving-side boss 12 rotates freely on the rotary shaft 32a as a center.

The coil spring 15 is wound counterclockwise from the driving-side boss 12 toward the driven-side boss 14 with a large-pitch portion 15c in the middle part thereof in which one wind with a pitch of 4 to 6 mm is formed. The large-pitch portion 15c is positioned in an area where the driving-side boss 12 and the driven-side boss 14 faces each other. This portion 15c is formed to prevent partial entrance of the coil spring 15 into between the driving-side boss 12 and driven-side boss 14. The driving-side coil end 15a of the coil spring 15 as well as the driven-side coil end 15b is bent outward so that these bent portions are used to engage with driving-side sleeve 16 and the driven-side sleeve 17, respectively. Rotational force in the clockwise direction (in the direction indicated by an arrow A) viewed from the driving gear 13 side is transmitted to the driving gear 13 through an unillustrated transmission gear. Accordingly, the coil spring 15 is wound in the opposite direction to that of the rotating direction of the driving gear 13 and the driving-side boss 12.

The material, feature and the like of the coil spring 15 may be the same with those in the coil spring 5 described previously. The material and surface-treatment state and the like of the driving-side boss 12 and the driven-side boss 14 may be the same with those in the driving-side boss 2 and driven-side boss 4 described above.

Figure 11:
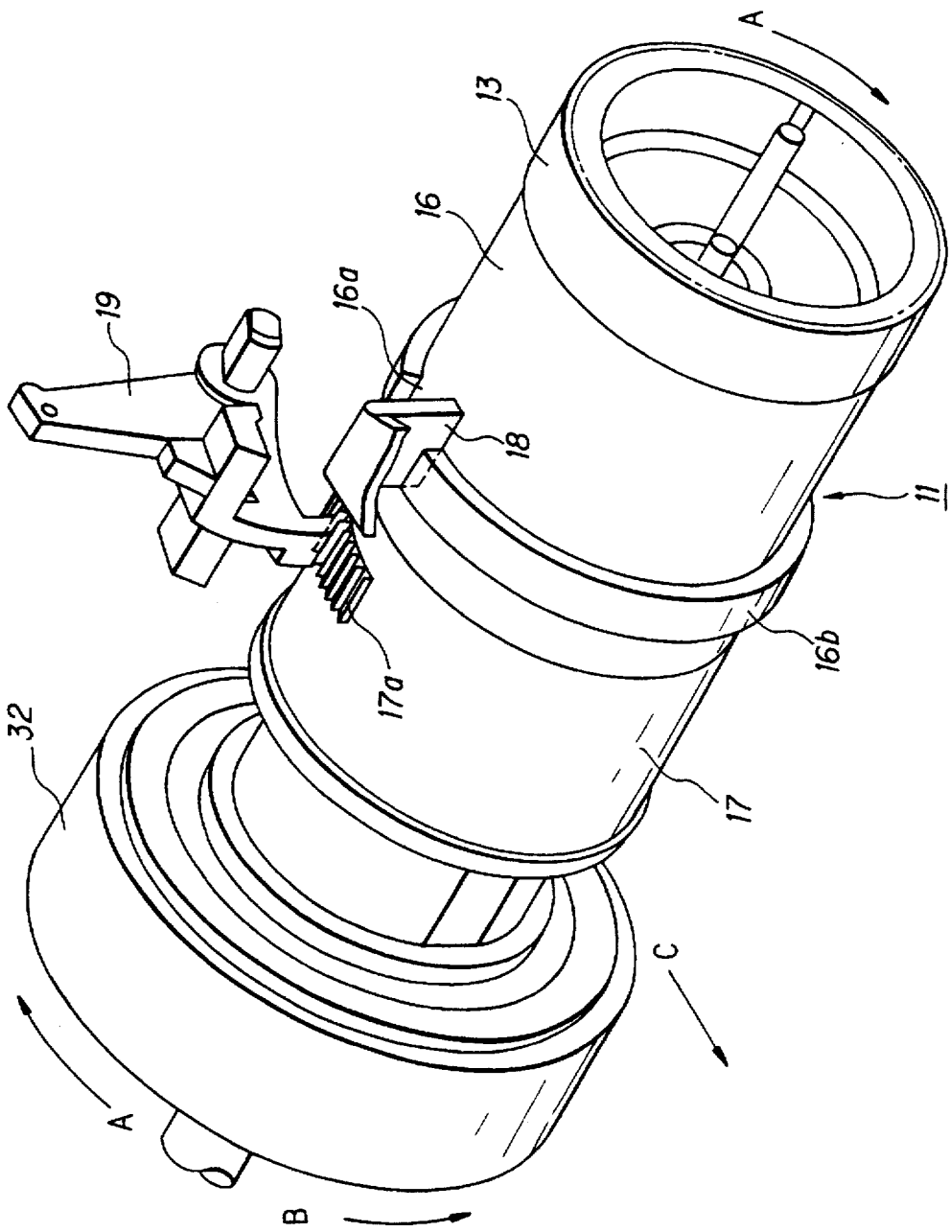
FIG. 11 is an appearance view showing the same spring clutch in its used state.

FIG. 11 is an appearance view showing the above spring clutch in its using state. This figure shows a state where the spring clutch 11 is applied to the paper feed portion 21 in the laser printer 20 shown in FIG. 2. The spring clutch 11 selectively transmits the rotation of the driving gear 13 in the direction indicated by an arrow A to the feed roller 32 so as to convey a copy sheet placed beneath the feed roller 32 in the direction indicated By an arrow C. A moveable plate 18 serving as a stopper of the invention is separably disposed opposite to the peripheral surface of the driving-side sleeve 16 of the spring clutch 11 while a lever 19 as a link stopper of the invention is separably disposed opposite to the peripheral surface of the driven-side sleeve 17. As in the same manner shown in FIG. 6, the moving plate 18 moves up and down in response with the activation or deactivation of an unillustrated solenoid disposed facing the upper side of the plate 18. The lever 19 moves up and down in link with the movement of the moving plate 18.

Figure 12A:
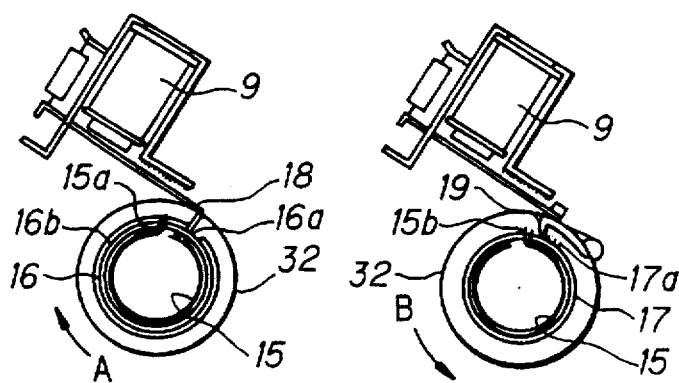
FIG. 12A is a view showing an initial operation state of the spring clutch shown in FIGS. 10 and 11.

FIGS. 12A through 12D are diagrams illustrating the operation of the above spring clutch. The moving plate 18 is disposed opposite to the rib 16b on the driving-side sleeve 16 while the lever 19 is in opposition to the toothed portion 17a on the driven-side sleeve 17. When the solenoid designated at 9 is deactivated as shown in FIG. 12A, the moving plate 18 is fitted in the recess 16a to inhibit the driving-side sleeve 16 from rotating in the direction of arrow A. The lever 19 abuts the toothed portion 17a that rotates in the direction of arrow B to inhibit the rotation of the driven-side sleeve 17 in the direction of arrow B. The driving-side sleeve 16 is engaged with the driving-side coil end 15a of the coil spring 15 as described above. Accordingly, as the rotation of the driving-side sleeve 16 in the direction of arrow A is restricted, the rotation of the driving-side boss 12 in the direction of arrow A causes the coil spring 15 to expand its inside diameter. This augment of the diameter of the coil spring 15 causes the coil spring 15 to idly hold the driving-side boss 12, whereby the rotation of the driving-side boss 12 in the direction of arrow A will not be transmitted to the driven-side boss 14 as well as to the feed roller 21.

The driven-side sleeve 17 is engaged with the driven-side coil end 15b of the coil spring 15. Accordingly, as the rotation of the driven-side sleeve 17 in the direction of arrow B is restricted, the rotation of the feed roller 32 and the driven-side boss 14 in the direction of arrow A cause the coil spring 15 to reduce its inside diameter. This reduction of the diameter of the coil spring 15 causes the coil spring 15 to tend to grip the driven-side boss 14. At the same time, the force acted on the coil spring 15 by the rotation of the driving-side boss 12 in the direction of arrow A to expand the inside diameter of the spring 15 is transmitted to the driven-side coil end 15b of the coil spring 15, whereby the coil spring 15 does not grip the driven-side boss 14. Accordingly, in this state, the driven-side boss 14 as well as the feed roller 32 can freely rotate in the direction of arrow A.

Further, in the state where the driven-side sleeve 17 is inhibited from rotating in the direction of arrow B, the rotation of the feed roller 32 and driven-side boss 14 in the direction of arrow B causes the coil spring 15 to expand its inside diameter so that the coil spring 15 is idly fitted to the driven-side boss 14. As a result, the feed roller 32 and the driven-side boss 14 can freely rotate in the direction of arrow B.

Since the toothed portion 17a in the driven-side boss 17 is to be engaged with the lever 19 which operates in link with the moving plate 18 to be fitted into the recess 16a of the driven-side boss 16, the position in which the toothed portion 17a is formed on the peripheral surface of the driven-side boss 17 should ideally be specified at a site by the circumferential position on the peripheral surface of the driving-side sleeve 16 as well as the positional relation between the moving plate 18 and the lever 19. In practice, however, it is impossible to uniquely determine the formed position of the toothed portion 17a on the driven-side sleeve 17 relative to the formed position of the recess 16a on the driving-side sleeve 16 because there are some error factors such as of the inside diameter and the number of turns of the coil spring 15, the outside diameters of the driving-side sleeve 16 and the driven-side sleeve 17 and the like. This is why the toothed portion 17a is formed of a series of teeth arranged around an ideal design position. This configuration eliminates the necessity of strictly controlling parts with precision and thus makes it possible to simplify the assembly work of the spring clutch 11.

In the case where the tooth portion 17a is formed with a series of teeth, as the solenoid 9 is once activated from the turn-off state to cancel the abutment of the lever 19 onto the toothed portion 17a and again is deactivated, the lever 19 comes into contact with a number of teeth in the toothed portion 17a to thereby generate a clicking noise and abrasion. To avoid this, the rib 16b is formed on the driving-side sleeve 16 so as to cause the moving plate 18 in link with the lever 19 to keep the lever 19 out of contact with the toothed portion 17a until the driven-side sleeve 17 makes one revolution together with the driving-side sleeve 16 even if the solenoid 9 is turned off while the driven-side sleeve 17 is rotating. Thus, if the solenoid 9 is turned off right after the recess 16a as rotating by rotation of the driving-side sleeve 16 has passed by the moving plate 18, it is possible to avoid the generation of the clicking noise and abrasion due to the contact between the lever 19 and the toothed portion 17a.

Figure 12B:
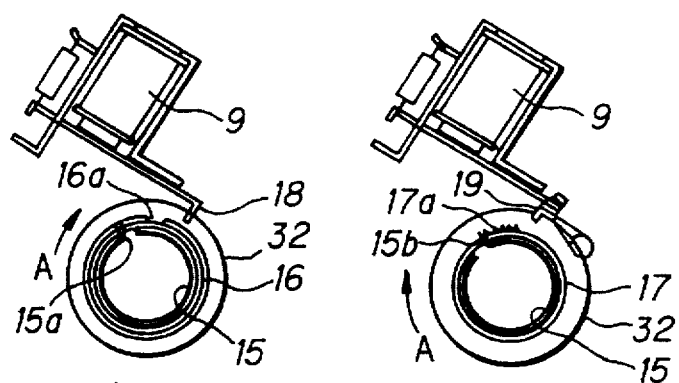
FIG. 12B is a view showing the following operation state of the spring clutch shown in FIG. 12A.

As shown in FIG. 12B, when the solenoid 9 is turned on, the moving plate 18 moves up so as not to mate the recess 16a, the restriction on the rotation of the driving-side sleeve 16 and the driving-side coil end 15a of the coil spring 15 is canceled. At the same time, the lever 19 releases the toothed portion 17a so that the restriction on the rotation of the driven-side sleeve 17 as well as the driven-side coil end 15b of the coil spring 15 is released. As the restriction on the rotation of the driving-side sleeve 16 and the driving-side coil end 15a of the coil spring 15 is canceled, the driving-side sleeve 16 and the driving-side coil end 15a of the coil spring 15 rotate in the direction of arrow A by the elastic force of the coil spring 15 therefore the coil spring 15 reduces in its inside diameter to grip the driving-side boss 12. As a result, the rotation of the driving-side boss 12 in the direction of arrow A is transmitted to the coil spring 15.

As the restriction on the rotation of the driven-side sleeve 17 as well as the driven-side coil end 15b of the coil spring 15 is released, the driven-side sleeve 17 and the driven-side coil end 15b of the coil spring 15 rotate in the direction of arrow A by the elastic force of the coil spring 15 therefore the coil spring 15 reduces in its inside diameter to grip the driven-side boss 14. As a result, the rotation in the direction of arrow A transmitted from the driving-side boss 12 is transmitted to the driven-side boss 14, whereby the driven-side boss 14 rotates in the direction of arrow A together with the feed roller 32.

Figure 12C:
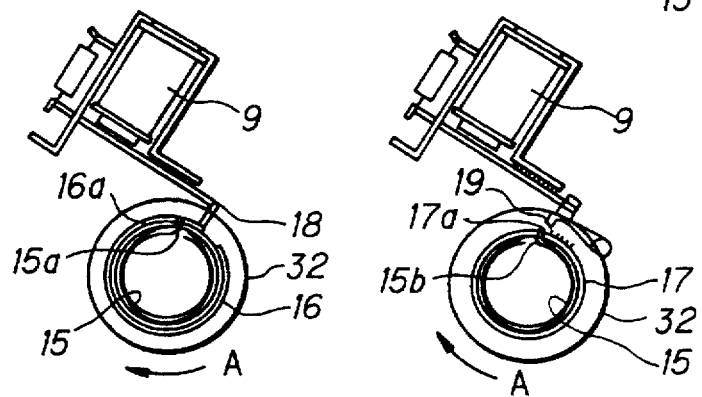
FIG. 12C is a view showing the following operation state of the spring clutch shown in FIG. 12C.

As shown in FIG. 12C, when the solenoid 9 is once turned on and then turned off by the completion of one revolution, the moving plate 18 abuts the top face of the rib 16b of the driving-side sleeve 16. Accordingly, the state shown in FIG. 12B will be maintained until the moving plate 18 again fits into the recess 16a after one revolution of the driving-side sleeve 16. During this or while the driven-side sleeve 17 makes one revolution together with the driving-side sleeve 16, the lever 19 linking with the moving plate 18 is kept disengaged with the toothed portion 17a as shown in FIG. 12B. When the driving-side sleeve 16 and the driven-side sleeve 17 have made one revolution, the state shown in FIG. 12A takes place.

Figure 12D:
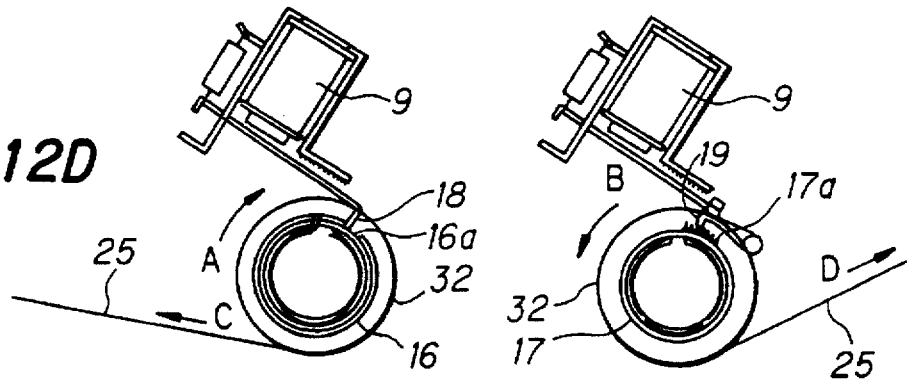
FIG. 12D is a view showing the following operation state of the spring clutch shown in FIG. 12C.

Now, let us consider a case that the spring clutch 11 which operates as described above is applied to the paper feeding device. In this case, the solenoid 9 is turned on within a short period of time from the state shown in FIG. 12A. This causes the moving plate 18 and lever 19 to be set into the state shown in FIG. 12B. In this condition, as the driving-side sleeve 16 as well as the driven-side sleeve 17 rotates together with the coil spring 15 in the direction of arrow A, the rotation of the driving-side boss 12 is transmitted to the driven-side boss 14 whereby the feed roller 32 is rotated in the direction of arrow A so as to feed the paper. Then, as the feed roller 32 has made one revolution, the state shown in FIG. 12A is recovered in which the rotation of the driving-side boss 12 in the direction of arrow A will not be transmitted to the feed roller 32. Still in this condition, the feed roller 32 and the driving-side boss 14 are able to rotate in either of the directions indicated by arrows A and B. Accordingly, as shown in FIG. 12D, when, after the feed roller 32 has stopped to rotate, the copy paper 25 in contact with the feed roller 32 is to be moved in the direction of an arrow C or D, for example, when the copy paper 25 is conveyed by the transfer roller (not shown) positioned downstream or in the forward position of the feed roller 32 with respect to the paper conveying direction, or when the copy paper 25 is jammed or delivered twofold and therefore to be drawn out from the paper feed portion, the feed roller 32 is allowed to be rotated in either direction of arrows A and B. As a result, it is possible to smoothly effect a conveying operation of the copy paper 25 as well as a releasing operation of paper feed failure.

As has been apparent from the above embodiments, the effects of the invention are summarized as follows:

In accordance with the first feature of the invention, it is possible to cause the coil spring to either idly hold or grip the driving shaft and driven shaft by engaging or disengaging the stopper with the engaging portion of the sleeve. That is, the rotation of the driving shaft can selectively be transmitted to the driven shaft via the coil spring. When the stopper is engaged with the engaging portion of the sleeve and therefore the coil spring is restricted from rotating, the driven shaft is prohibited from rotating in the direction opposite to the rotational direction of the driving shaft. That is, the driven shaft is allowed to freely rotated only in the rotational direction of the driving shaft, thus realizing the function of one-way clutch. Accordingly, it is possible to control the application of driving force to the driving shaft as well as to limit the rotation of the driven shaft to one-way rotation without needing an expensive one-way clutch, separately from a spring clutch, whereby the device can be reduced in cost and size.

Next, in accordance with the second feature of the invention, it is possible to prevent the free coil end of the coil spring on the driven-shaft side from coming into sliding contact with and damaging the peripheral surface of the driven shaft.

In accordance with the third feature of the invention, it is possible to cause the coil spring to either idly hold or grip the driving shaft and driven shaft by engaging or disengaging the stopper with the driving-side engaging portion. That is, the rotation of the driving shaft can selectively be transmitted to the driven shaft via the coil spring. When the stopper is in disengagement with the driving-side engaging portion, the driven shaft is allowed to freely rotate only in the rotational direction of the driving shaft, thus making it possible to realize the function of one-way clutch. Further, when the stopper is engaged with the driving-side engaging portion, the link stopper will engage the driven-side engaging portion whereby the driven shaft is allowed to freely rotate in both directions. Thus, it is possible to achieve complex, multiple functions by the simple configuration.

In accordance with the fourth feature of the invention, even if the position of the driven-side engaging portion actually formed on the driven-side boss deviates from the position of the driving-side engaging portion formed on the driving-side boss due to dimensional errors such as of the inside diameter, the number of turns in the coil spring, the outside diameters of the driving-side boss and the driven-side boss and the like, it is possible to surely engage the link stopper with the driven-side boss by absorbing the errors within a certain range.

In accordance with the fifth and sixth features of the invention, if the solenoid is turned off right after the driving-side engaging portion has passed by the stopper as the driving-side boss rotates, it is possible to avoid the generation of the clicking noise and abrasion due to the contact between the link stopper and part of driven-side engaging portion formed with a series of engaging segments.

In accordance with the above seventh through twelfth and twenty-third through twenty-sixth features of the invention, since the coil .spring can be formed with a relatively inexpensive material, it is possible to reduce the cost of the spring clutch mechanism as well as to produce enough great frictional contact to transmit rotation of the driving shaft to the driven shaft.

In accordance with the above thirteenth through eighteenth and twenty-seventh through thirtieth features of the invention, it is possible surely prevent damages to the device which would be caused when part of the coil spring contacting with the driving and driven shafts plunges into a gap between the driving and driven shafts.

Next, in accordance with the above nineteenth feature of the invention, it is possible to feed paper in appropriate timing. Further, since the feed roller is rotatable in both the forward and reverse directions in the state where transmission of the driving force to the feed roller is stopped, it is possible to markedly easily effect canceling operations of paper jam or twofold feeding of paper.

In accordance with the above twentieth feature of the invention, it is possible to transmit a sufficient driving force to the feed roller for paper feeding by using a coil spring having a circular section.

In accordance with the above twenty-first and twenty-second features of the invention, it is possible to allow the driven shaft to be idly held by the coil spring so that the feed roller may be rotated in both the forward and reverse directions when transmission of driving force to the feed roller is stopped.

What is claimed is:

1. A spring clutch mechanism for selectively transmitting rotation of a driving shaft to a driven shaft through a coil spring, said spring clutch mechanism comprising:

driving and driven shafts disposed opposite to each other on a common axis;

a coil spring formed of coil wire fitted on said driving and driven shafts;

a sleeve formed with an engaging portion at a site on the peripheral surface thereof; and a stopper selectively engaging the engaging portion of said sleeve that rotates in a rotational direction of the driving shaft, for restricting rotation of said sleeve, wherein said coil spring is formed such that the coil wire is wound around from the driving-shaft side toward the driven-shaft side in a winding direction opposite to that of the rotational direction of said driving shaft and the coil end on the driving-shaft side of said coil spring is engaged with said sleeve while the other coil end on the driven-shaft side of said coil spring is left free.

2. A spring clutch mechanism according to claim 1 wherein the winding diameter of the coil end on the driven-shaft side of said coil spring is made greater than the winding diameter of the other part of said coil spring.

3. A spring clutch mechanism for selectively transmitting rotation of a driving shaft to a driven shaft through a coil spring, said spring clutch mechanism comprising:

driving and driven shafts disposed opposite to each other on a common axis;

a coil spring formed of coil wire fitted on said driving and driven shafts, said coil spring being formed such that the coil wire is wound around from the driving-shaft side toward the driven-shaft side in a winding direction opposite to that of the rotational direction of said driving shaft;

a driving-side sleeve which is fitted over a part of said coil spring fitted on said driving shaft, engaged with the driving-side coil end of said coil spring and has a driving-side engaging portion formed in a site on the peripheral surface thereof;

a driven-side sleeve which is fitted over a part of said coil spring fitted on said driven shaft, engaged with the driven-side coil end of said coil spring and has a driven-side engaging portion formed in a site on the peripheral surface thereof;

a stopper which selectively engages the engaging portion of said driving-side sleeve to restrict rotation of said driving-side sleeve; and a link stopper which, in link with said stopper, selectively engages the engaging portion of said driven-side sleeve to restrict the rotation of said driven-side sleeve in the direction opposite to the rotational direction of said driving shaft.

4. A spring clutch mechanism for selectively transmitting rotation of a driving shaft to a driven shaft through a coil spring, said spring clutch mechanism comprising:

driving and driven shafts disposed opposite to each other on a common axis;

a coil spring formed of coil wire fitted on said driving and driven shafts, said coil spring being formed such that the coil wire is wound around from the driving-shaft side toward the driven-shaft side in a winding direction opposite to that of the rotational direction of said driving shaft;

a driving-side sleeve which is fitted over a part of said coil spring fitted on said driving shaft, engaged with the driving-side coil end of said coil spring and has a driving-side engaging portion formed in a site on the peripheral surface thereof;

a driven-side sleeve which is fitted over a part of said coil spring fitted on said driven shaft, engaged with the driven-side coil end of said coil spring and has a driven-side engaging portion formed of a series of engaging segments circumferentially extending in a site on the peripheral surface thereof;

a stopper which selectively engages the engaging portion of said driving-side sleeve to restrict rotation of said driving-side sleeve; and a link stopper which, in link with said stopper, selectively engages the engaging portion of said driven-side sleeve to restrict the rotation of said driven-side sleeve in the direction opposite to the rotational direction of said driving shaft.

5. A spring clutch mechanism according to claim 3 further comprising:

a supporting member which when said stopper is not engaged with said driving-side engaging portion, supports said link stopper so as not to be engaged with said driven-side engaging portion, to keep said stopper and link stopper in the disengaged state.

6. A spring clutch mechanism according to claim 4 further comprising:

a supporting member which when said stopper is not engaged with said driving-side engaging portion, supports said link stopper so as not to be engaged with said driven-side engaging portion, to keep said stopper and link stopper in the disengaged state.

7. A spring clutch mechanism according to claim 1 wherein said coil spring has a circular cross section and said driving and driven shafts have a plurality of grooves circumferentially extending on their peripheral surface thereof over which said coil spring is fitted.

8. A spring clutch mechanism according to claim 2 wherein said coil spring has a circular section and said driving and driven shafts have a plurality of grooves circumferentially extending on their peripheral surface thereof over which said coil spring is fitted.

9. A spring clutch mechanism according to claim 3 wherein said coil spring has a circular section and said driving and driven shafts have a plurality of grooves circumferentially extending on their peripheral surface thereof over which said coil spring is fitted.

10. A spring clutch mechanism according to claim 4 wherein said coil spring has a circular section and said driving and driven shafts have a plurality of grooves circumferentially extending on their peripheral surface thereof over which said coil spring is fitted.

11. A spring clutch mechanism according to claim 5 wherein said coil spring has a circular section and said driving and driven shafts have a plurality of grooves circumferentially extending on their peripheral surface thereof over which said coil spring is fitted.

12. A spring clutch mechanism according to claim 6 wherein said coil spring has a circular section and said driving and driven shafts have a plurality of grooves circumferentially extending on their peripheral surface thereof over which said coil spring is fitted.

13. A spring clutch mechanism according to claim 7 wherein said coil spring has a large-pitch portion over a position where said driving shaft and said driven shaft are opposed to each other.

14. A spring clutch mechanism according to claim 8 wherein said coil spring has a large-pitch portion over a position where said driving shaft and said driven shaft are opposed to each other.

15. A spring clutch mechanism according to claim 9 wherein said coil spring has a large-pitch portion over a position where said driving shaft and said driven shaft are opposed to each other.

16. A spring clutch mechanism according to claim 10 wherein said coil spring has a large-pitch portion over a position where said driving shaft and said driven shaft are opposed to each other.

17. A spring clutch mechanism according to claim 11 wherein said coil spring has a large-pitch portion over a position where said driving shaft and said driven shaft are opposed to each other.

18. A spring clutch mechanism according to claim 12 wherein said coil spring has a large-pitch portion over a position where said driving shaft and said driven shaft are opposed to each other.

19. An apparatus including in combination a clutch mechanism and a feed roller for use in a paper feed device for feeding paper stacked on a tray one by one by rotating a feed roller, comprising:

a driving shaft connected to a driving source;

a driven shaft disposed opposite to said driving shaft on a common axis with said driving shaft;

the feed roller fixed to said driven shaft;

a coil spring formed of coil wire fitted on said driving and driven shafts for selectively transmitting rotation of said driving shaft to said driven shaft therethrough, said coil spring being formed such that the coil wire is wound around from the driving-shaft side toward the driven-shaft side in a winding direction opposite to that of the rotational direction of said driving shaft;

a driving-side sleeve which is fitted over a part of said coil spring fitted on said driving shaft, engaged with the driving-side coil end of said coil spring and has a driving-side engaging portion formed in a site on the peripheral surface thereof;

a driven-side sleeve which is fitted over a part of said coil spring fitted on said driven shaft, engaged with the driven-side coil end of said coil spring and has a driven-side engaging portion formed in a site on the peripheral surface thereof;

a stopper which selectively engages the engaging portion of said driving-side sleeve to restrict rotation of said driving-side sleeve; and a link stopper which, in link with said stopper, selectively engages the engaging portion of said driven-side sleeve to restrict the rotation of said driven-side sleeve in the direction opposite to the rotational direction of said driving shaft.

20. A clutch mechanism for use in a paper feed device according to claim 19 wherein said coil spring has a circular cross section of 0.6 to 0.7 mm in diameter.

21. A clutch mechanism for use in a paper feed device according to claim 19 wherein of said driving and driven shafts, at least the portions on which said spring coil is fitted is formed of a cylindrical feature having an outside diameter of about 0.1 to 0.3 mm greater than the inside diameter of said coil spring.

22. A clutch mechanism for use in a paper feed device according to claim 20 wherein of said driving and driven shafts, at least the portions on which said spring coil is fitted is formed of a cylindrical feature having an outside diameter of about 0.1 to 0.3 mm greater than the inside diameter of said coil spring.

23. A clutch mechanism for use in a paper feed device according to claim 19 wherein said coil spring has a circular section and said driving and driven shafts have a plurality of grooves circumferentially extending on their peripheral surface thereof over which said coil spring is fitted.

24. A clutch mechanism for use in a paper feed device according to claim 20 wherein said coil spring has a circular cross section and said driving and driven shafts have a plurality of grooves circumferentially extending on their peripheral surface thereof over which said coil spring is fitted.

25. A clutch mechanism for use in a paper feed device according to claim 21 wherein said coil spring has a circular cross section and said driving and driven shafts have a plurality of grooves circumferentially extending on their peripheral surface thereof over which said coil spring is fitted.

26. A clutch mechanism for use in a paper feed device according to claim 22 wherein said coil spring has a circular cross section and said driving and driven shafts have a plurality of grooves circumferentially extending on their peripheral surface thereof over which said coil spring is fitted.

27. A clutch mechanism for use in a paper feed device according to claim 23 wherein said coil spring has a large-pitch portion over a position where said driving shaft and said driven shaft are opposed to each other.

28. A clutch mechanism for use in a paper feed device according to claim 24 wherein said coil spring has a large-pitch portion over a position where said driving shaft and said driven shaft are opposed to each other.

29. A clutch mechanism for use in a paper feed device according to claim 25 wherein said coil spring has a large-pitch portion over a position where said driving shaft and said driven shaft are opposed to each other.

30. A clutch mechanism for use in a paper feed device according to claim 26 wherein said coil spring has a large-pitch portion over a position where said driving shaft and said driven shaft are opposed to each other.

* * * * *